United States Patent
Saeedi et al.

(10) Patent No.: US 9,064,464 B2
(45) Date of Patent: Jun. 23, 2015

(54) SYSTEMS AND METHODS FOR CALIBRATING A DISPLAY TO REDUCE OR ELIMINATE MURA ARTIFACTS

(71) Applicant: APPLE INC., Cupertino, CA (US)

(72) Inventors: Saman Saeedi, Cupertino, CA (US); Shafiq M. Jamal, Pleasanton, CA (US); Ahmad Al-Dahle, Santa Clara, CA (US)

(73) Assignee: APPLE INC., Cupertino, CA (US)

(*) Notice: Subject to any disclaimer, the term of this patent is extended or adjusted under 35 U.S.C. 154(b) by 145 days.

(21) Appl. No.: 13/715,702

(22) Filed: Dec. 14, 2012

(65) Prior Publication Data
US 2013/0342431 A1 Dec. 26, 2013

Related U.S. Application Data

(60) Provisional application No. 61/663,977, filed on Jun. 25, 2012.

(51) Int. Cl.
*G09G 3/36* (2006.01)
*G09G 3/00* (2006.01)

(52) U.S. Cl.
CPC .............. *G09G 3/3607* (2013.01); *G09G 3/006* (2013.01); *G09G 3/3655* (2013.01); *G09G 2320/0204* (2013.01); *G09G 2320/0219* (2013.01); *G09G 2320/0233* (2013.01); *G09G 2320/0247* (2013.01); *G09G 2320/029* (2013.01); *G09G 2320/0295* (2013.01); *G09G 2320/041* (2013.01); *G09G 2320/0626* (2013.01); *G09G 2320/0693* (2013.01); *G09G 2330/12* (2013.01)

(58) Field of Classification Search
CPC ..... G09G 3/32; G09G 3/3208; G09G 3/3225; G09G 3/3258; G09G 3/3275; G09G 3/36–3/3696; G09G 2300/08; G09G 2310/02–2310/0221; G09G 2320/0219; G09G 2320/029; G09G 2320/0295; G09G 2320/0693
USPC ................... 345/87–104, 204, 690, 208–211
See application file for complete search history.

(56) References Cited

U.S. PATENT DOCUMENTS

| | | | |
|---|---|---|---|
| 6,424,330 B1 | 7/2002 | Johnson | |
| 8,217,928 B2 | 7/2012 | Levey et al. | |
| 8,648,780 B2* | 2/2014 | Feng | 345/89 |
| 2002/0041278 A1* | 4/2002 | Matsueda | 345/204 |

(Continued)

FOREIGN PATENT DOCUMENTS

EP 2214156 A1 8/2010

OTHER PUBLICATIONS

International Search Report and Written Opinion for PCT No. PCT/US2013/047573 dated Sep. 19, 2013; 17 pgs.

(Continued)

*Primary Examiner* — Stephen Sherman
(74) *Attorney, Agent, or Firm* — Fletcher Yoder PC

(57) ABSTRACT

Systems, methods, and devices are provided to reduce or eliminate mura artifacts on electronic displays. For example, pixels may be programmed to a uniform gray level before all or a substantial number of gates of the pixels are activated. The voltages on some or all source lines that supply the pixels may be measured. A mura artifact may be seen when voltage differences on the source lines are present. As such, operational parameters of the electronic display may be adjusted to reduce or eliminate the mura artifact by reducing the voltage differences.

31 Claims, 19 Drawing Sheets

(56) References Cited

U.S. PATENT DOCUMENTS

| | | | |
|---|---|---|---|
| 2003/0098839 A1* | 5/2003 | Lee | 345/89 |
| 2004/0100287 A1* | 5/2004 | Taguchi | 324/678 |
| 2006/0273997 A1 | 12/2006 | Nathan et al. | |
| 2007/0024560 A1 | 2/2007 | Kim et al. | |
| 2008/0048951 A1 | 2/2008 | Naugler et al. | |
| 2008/0224983 A1 | 9/2008 | Lee et al. | |
| 2008/0231557 A1 | 9/2008 | Naugler et al. | |
| 2009/0213049 A1 | 8/2009 | McCreary | |
| 2010/0245326 A1 | 9/2010 | Xiao | |
| 2012/0120117 A1 | 5/2012 | Hsieh et al. | |

OTHER PUBLICATIONS

U.S. Appl. No. 61/657,667, filed Jun. 8, 2012, Ahmad Al-Dahle.
U.S. Appl. No. 61/657,671, filed Jun. 8, 2012, Hopil Bae.

* cited by examiner

… (US 9,064,464 B2)

SYSTEMS AND METHODS FOR CALIBRATING A DISPLAY TO REDUCE OR ELIMINATE MURA ARTIFACTS

CROSS REFERENCE TO RELATED APPLICATIONS

This application is a Non-Provisional patent application of U.S. Provisional Patent Application No. 61/663,977, entitled "Systems and Methods for Calibrating a Display to Reduce or Eliminate Mura Artifacts", filed Jun. 25, 2012, which are herein incorporated by reference.

BACKGROUND

This disclosure relates generally to electronic displays and, more particularly, calibrating electronic displays to reduce or eliminate mura artifacts.

This section is intended to introduce the reader to various aspects of art that may be related to various aspects of these techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

Electronic displays commonly appear in electronic devices such as televisions, computers, and phones. One type of electronic display, known as a liquid crystal display (LCD), displays images by modulating the amount of light allowed to pass through a liquid crystal layer within pixels of the LCD. In general, LCDs modulate the light passing through each pixel by varying a voltage difference between a pixel electrode and a common electrode. This creates an electric field that causes the liquid crystal layer to change alignment. The change in alignment of the liquid crystal layer causes more or less light to pass through the pixel. By changing the voltage difference (often referred to as a data signal) supplied to each pixel, images are produced on the LCD.

Conventionally, the common electrodes of the pixels of the LCD are all formed from a single common voltage layer (VCOM). Thus, to the extent that undesirable bias voltages or voltage perturbations may occur in the VCOM, any resulting negative effects would be distributed over the entire LCD. When an LCD includes multiple VCOMs, however, it is believed that undesirable bias voltages or voltage perturbations may occur differentially on the various VCOMs. These differential bias voltages or voltage perturbations could produce visible artifacts known as muras, or largely permanent display screen artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of this disclosure relate to systems, methods, and devices for reducing or eliminating mura artifacts in electronic displays, such as liquid crystal displays (LCDs). In a particular example, it is believed that certain artifacts or muras could arise in an LCD having multiple distinct common voltage layers (VCOMs). For example, an LCD with VCOMs generally arranged in alternating rows and columns may exhibit a vertical stripe feature of merit. The vertical stripe feature of merit may be visible to a user as alternating light and dark vertical stripes along the LCD.

Various embodiments of this disclosure may reduce or eliminate such artifacts, even without need for external feedback from outside the display (e.g., without need to visually observe the display). Indeed, the electronic display may be calibrated by programming a frame of pixels with a gray level that induces contrasting mura artifacts on the display. The visibility of these artifacts may be due to subtle differences in voltages on different components of the display. For example, it is believed that an LCD with VCOMs generally arranged in alternating rows and columns may produce the vertical stripe feature of merit discussed above. Once the gray level has been programmed onto the pixels, all or a substantial subset of the gate lines may be turned on at once.

By activating the gate lines, the voltages on the pixels may be accessible on the source lines. These voltages may be measured by shunting the source lines of the display to voltage measurement circuitry associated with the display. The voltage measurement circuitry may determine voltage measurements from which to gauge the extent of the mura artifact on the display. Specifically, the subtle voltage differences that cause the mura artifact to appear on the display may be detected and, using these measurements, certain operating parameters of the display may be adjusted. These operating parameters may include, among other things, a gate clock fall time, a gate clock overlap, a source output parking voltage, and/or a resistance or capacitance that is added to certain VCOMs of the display. The adjustment to the operating parameters may cause the voltage differences between pixels to diminish, thereby reducing or eliminating the mura artifact.

Various refinements of the features noted above may exist in relation to various aspects of this disclosure. Further features may also be incorporated in these various aspects as well. These refinements and additional features may exist individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
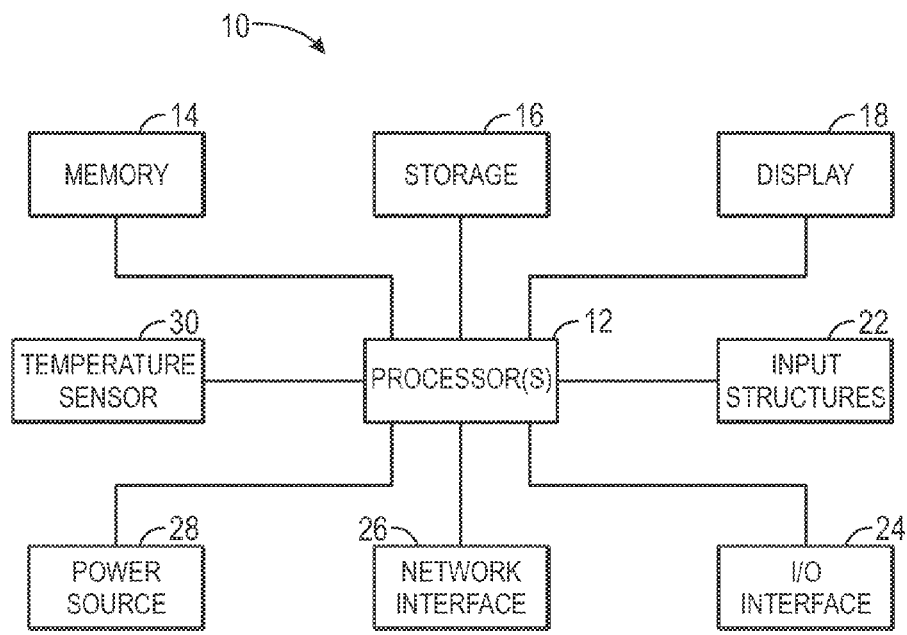
FIG. 1 is a block diagram of an electronic device with a liquid crystal display (LCD) that can be calibrated such that mura artifacts are reduced or eliminated, in accordance with an embodiment.

One or more specific embodiments of this disclosure will be described below. These described embodiments are only examples of the disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of this disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of this disclosure are not intended to be interpreted as excluding the existence of additional embodiments that also incorporate the recited features.

As mentioned above, this disclosure relates to systems, methods, and devices for reducing or eliminating mura artifacts in electronic displays, such as liquid crystal displays (LCDs). Indeed, it is believed that certain mura artifacts—artifacts that persist throughout the operation of the display—may arise in a display having multiple distinct common voltage layers (VCOMs). For instance, an LCD with VCOMs generally arranged in alternating rows and columns may exhibit a vertical stripe feature of merit. The vertical stripe feature of merit may be visible to a user as alternating light and dark vertical stripes oriented parallel to the source lines of the display.

Such unsightly mura artifacts may be reduced or eliminated with proper tuning. In fact, mura artifacts may be detected by measuring voltages applied to the pixels, even without any external observation. To do this, the display may include self-calibration circuitry that includes circuitry to measure the voltage differences on the pixels of the display. Since the muras may be more apparent at certain gray levels (e.g., gray level G63 in an 8-bit display), such a gray level may be programmed onto the pixels of the display. Thereafter, all or a substantial subset of the gate lines may be activated. The resulting voltages on the source lines may be measured. Differences in voltage on difference source lines may correspond to lighter or darker areas of the display.

Using these voltage measurements, operating parameters of the display may be tuned, causing the display to show a reduced or eliminated mura artifact. In one example, the operating parameters may be determined over the course of a single frame of programmed pixels. A look-up table (LUT) or a mathematical function derived experimentally from testing samples of the displays may prescribe specific operational parameters for specific voltage differences. Additionally or alternatively, the display may be calibrated over the course of several frames by gradually adjusting the operational parameters based on feedback measurements of the voltage differences. After calibration, the mura artifact may be reduced or eliminated from the display.

Figure 2:
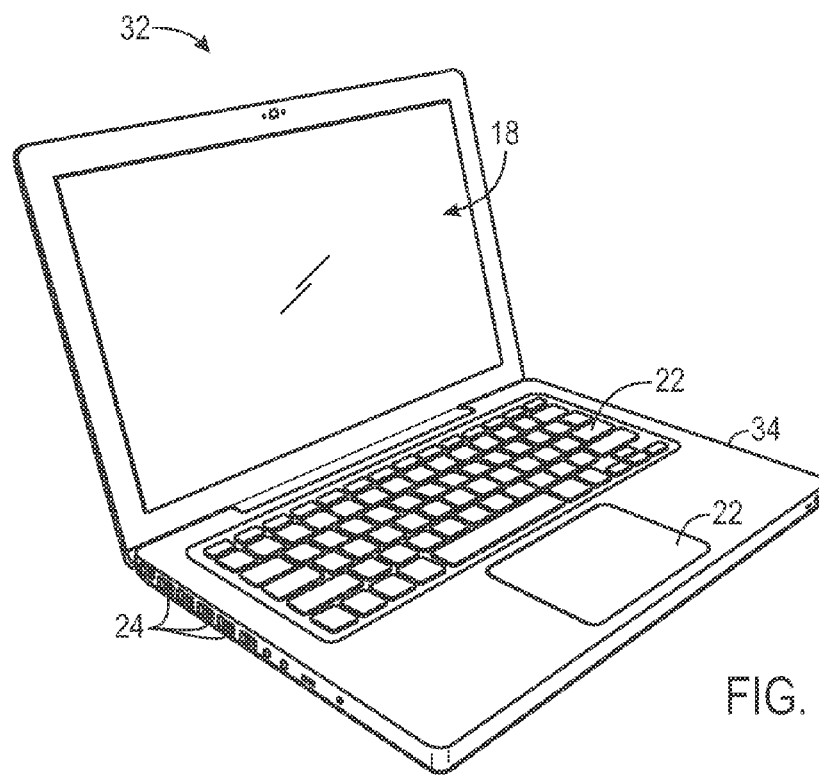
FIG. 2 is a perspective view of a notebook computer representing an embodiment of the electronic device of FIG. 1.
Figure 3:
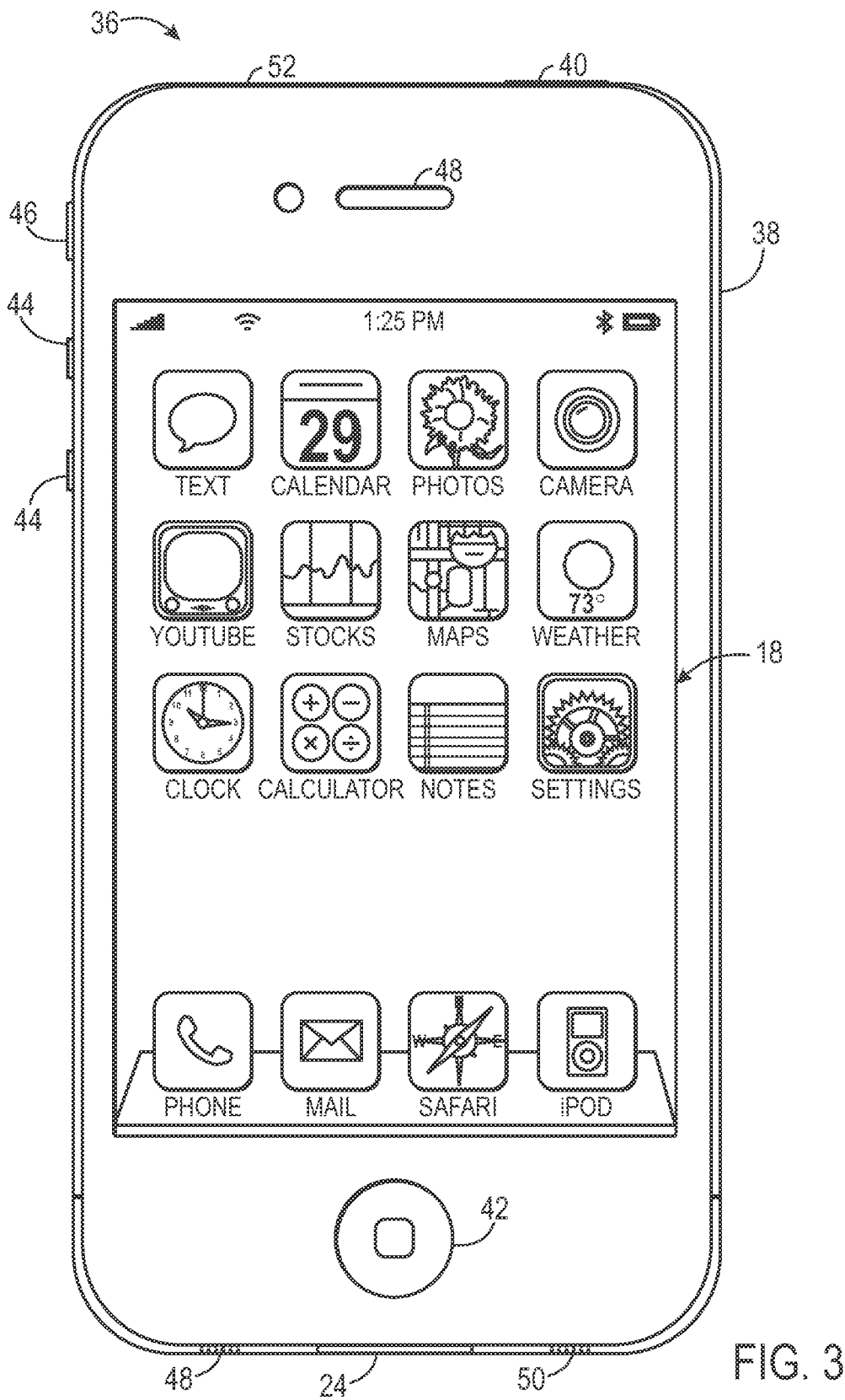
FIG. 3 is a front view of a handheld electronic device representing another embodiment of the electronic device of FIG. 1.

With the foregoing in mind, many suitable electronic devices may employ electronic displays tuned such that mura artifacts are reduced or eliminated. For example, FIG. 1 is a block diagram depicting various components that may be present in an electronic device suitable for use with such a display. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of this disclosure may include, among other things, one or more processor(s) 12, memory 14, nonvolatile storage 16, a display 18, input structures 22, an input/output (I/O) interface 24, network interfaces 26, a power source 28, and/or a temperature sensor 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As will be appreciated, when there is a variation in voltage perturbation between VCOMs of the display 18, image quality of the display 18 may be distorted. For example, portions of the display 18 using one VCOM could produce different colors than portions of the display 18 using a different VCOM unless made more uniform, as taught by this disclosure.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. The data processing circuitry may control the initiation of the calibration of the display 18.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a Multi-Touch™ display that can detect multiple touches at once. As will be described further below, the display 18 may include at least two distinct common voltage layers (VCOMs). Though these distinct VCOMs could produce mura artifacts, such as a vertical stripe feature of merit, these artifacts may be reduced by adjusting operating parameters of the display 18. The operational parameters adjusted include a gate clock fall time of the display 18, a gate clock overlap of the display 18, a resistance and/or capacitance added to the VCOMs of the display 18, and/or a source output parking voltage of the display 18. The display 18 may self-calibrate using voltage measurement circuitry to measure the voltages of the source lines of the display 18. Additionally or alternatively, the processor(s) 12 may calibrate the display 18 based on voltage measurements obtained by the display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter. The temperature sensor 30 may detect the temperature of the electronic device 10. The temperature may be used by some embodiments to calibrate the display 18.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 32, is illustrated in FIG. 2 in accordance with one embodiment of this disclosure. The depicted computer 32 may include a housing 34, a display 18, input structures 22, and ports of an I/O interface 24. In one embodiment, the input structures 22 (such as a keyboard and/or touchpad) may be used to interact with the computer 32, such as to start, control, or operate a GUI or applications running on computer 32. The display 18 may be tuned to reduce or eliminate mura artifacts.

FIG. 3 depicts a front view of a handheld device 36, which represents one embodiment of the electronic device 10. The handheld device 36 may represent, for example, a portable phone, a media player, a personal data organizer, a handheld game platform, or any combination of such devices. By way of example, the handheld device 36 may be a model of an iPod® or iPhone® available from Apple Inc. of Cupertino, Calif. In other embodiments, the handheld device 36 may be a tablet-sized embodiment of the electronic device 10, which may be, for example, a model of an iPad® available from Apple Inc.

The handheld device 36 may include an enclosure 38 to protect interior components from physical damage and to shield them from electromagnetic interference. The enclosure 38 may surround the display 18. The I/O interfaces 24 may open through the enclosure 38 and may include, for example, a proprietary I/O port from Apple Inc. to connect to external devices.

User input structures 40, 42, 44, and 46, in combination with the display 18, may allow a user to control the handheld device 36. For example, the input structure 40 may activate or deactivate the handheld device 36, the input structure 42 may navigate a user interface to a home screen, a user-configurable application screen, and/or activate a voice-recognition feature of the handheld device 36, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. The display 18 may be tuned to reduce or eliminate mura artifacts.

Figure 4:
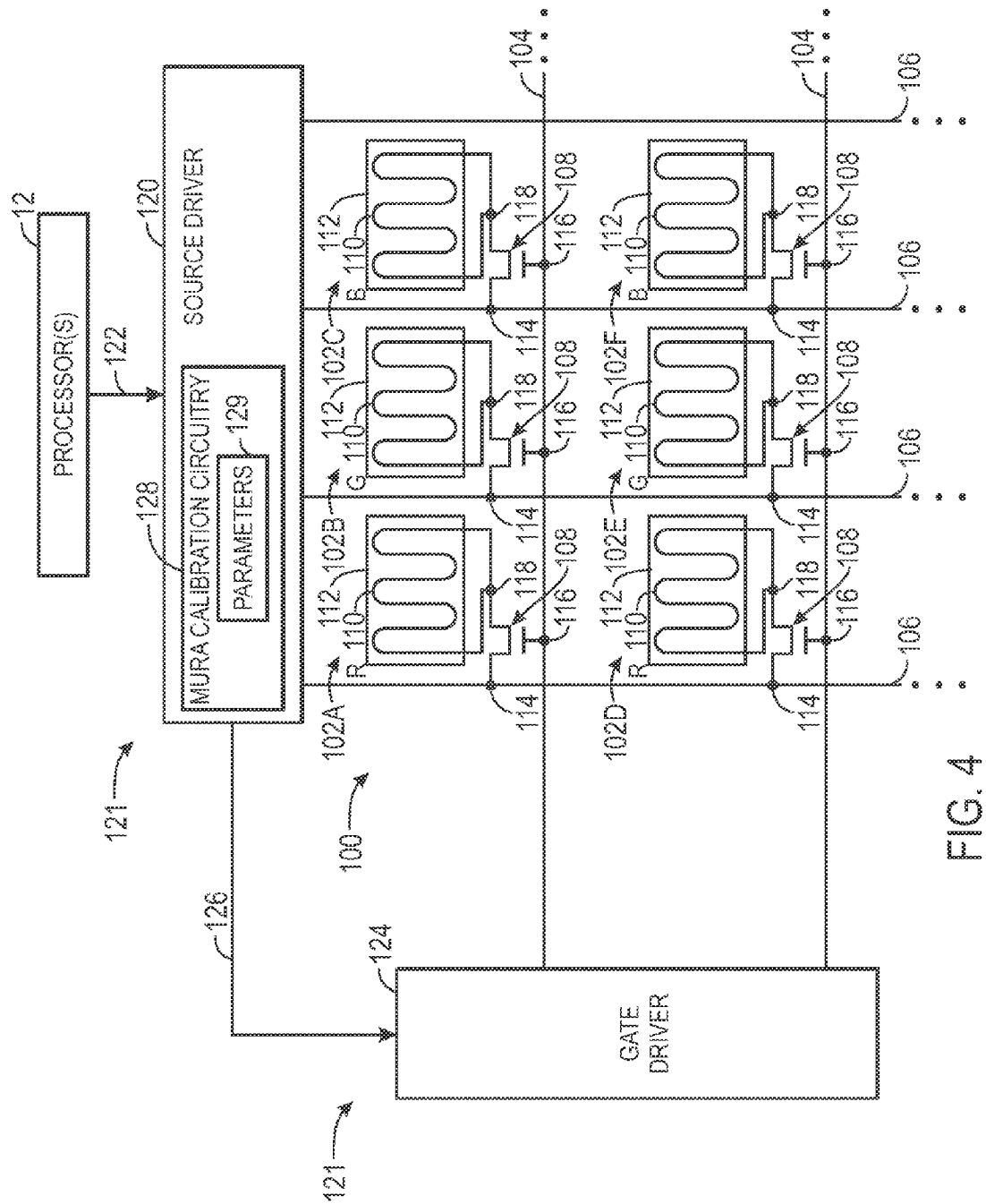
FIG. 4 is a circuit diagram illustrating display circuitry of the LCD that includes mura calibration circuitry, in accordance with an embodiment.

The display 18 may operate by activating and programming a number of picture elements, or pixels. These pixels may be generally arranged in a pixel array 100, as shown in FIG. 4. The pixel array 100 of the display 18 may include a number of unit pixels 102 disposed in a pixel array or matrix. In such an array, each unit pixel 102 may be defined by an intersection of gate lines 104 (also referred to as scanning lines) and source lines 106 (also referred to as data lines). Although only six unit pixels 102 are shown (102A-102F), it should be understood that in an actual implementation, the pixel array 100 may include hundreds or thousands of such unit pixels 102. Each of the unit pixels 102 may represent one of three subpixels that respectively filter only one color (e.g., red, blue, or green) of light. For purposes of this disclosure, the terms "pixel," "subpixel," and "unit pixel" may be used largely interchangeably.

In the example of FIG. 4, each unit pixel 102 includes a thin film transistor (TFT) 108 for switching a data signal supplied to a respective pixel electrode 110. The potential stored on the pixel electrode 110 relative to a potential of a common electrode 112 may generate an electrical field sufficient to alter the arrangement of a liquid crystal layer of the display 18. When the arrangement of the liquid crystal layer changes, the amount of light passing through the pixel 102 also changes. A source 114 of each TFT 108 may connect to a source line 106 and a gate 116 of each TFT 108 may connect to a gate line 104. A drain 118 of each TFT 108 may be connect to a respective pixel electrode 110. Each TFT 108 may serve as a switching element that may be activated and deactivated by a scanning or activation signal on the gate lines 104.

When activated, a TFT 108 may pass the data signal from its source line 106 onto its pixel electrode 110. As noted above, the data signal stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

These signals and other operating parameters of the display 18 may be controlled by integrated circuits (ICs) 121 of the display 18. These driver ICs 121 of the display 18 may include a processor, microcontroller, or application specific integrated circuit (ASIC). The driver ICs 121 may be chip-on-glass (COG) components on a TFT glass substrate, components of a display flexible printed circuit (FPC), and/or components of a printed circuit board (PCB) that is connected to the TFT glass substrate via the display FPC. Further, the driver ICs 121 of the display 18 may include the source driver 120 may include any suitable article of manufacture having one or more tangible, computer-readable media for storing instructions that may be executed by the driver ICs 121.

For instance, a source driver integrated circuit (IC) 120 may receive image data 122 from the processor(s) 12 and send corresponding image signals to the unit pixels 102 of the pixel array 100. The source driver 120 may also couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner.

Mura calibration circuitry 128 may enable the display 18 to self-calibrate. For instance, the mura calibration circuitry 128 may measure the voltage differences on the pixels 102 that cause the mura artifact. The mura calibration circuitry 128 may adjust values of certain operational parameters 129 of the display 18 to reduce or eliminate mura artifacts on the display 18. As will be discussed below, the operational parameters 129 may be programmed according to any suitable methods, including those discussed further below. Operational parameters 129 that may be programmed include a gate clock overlap, a gate clock fall time, a source output parking voltage, and/or a resistance of various common voltage layers (VCOMs) of the display 18.

Some mura artifacts may be due to the arrangement of common voltage layers (VCOMs) serving as common electrodes 112. In particular, when the VCOMs of the display 18 appear as rows and columns, striping muras known as vertical stripe features of merit may occur. One example arrangement of various VCOMs of the display 18 appears in FIG. 5. This arrangement could cause mura artifacts on the display 18 unless the operational parameters 129 are properly tuned.

Figure 5:
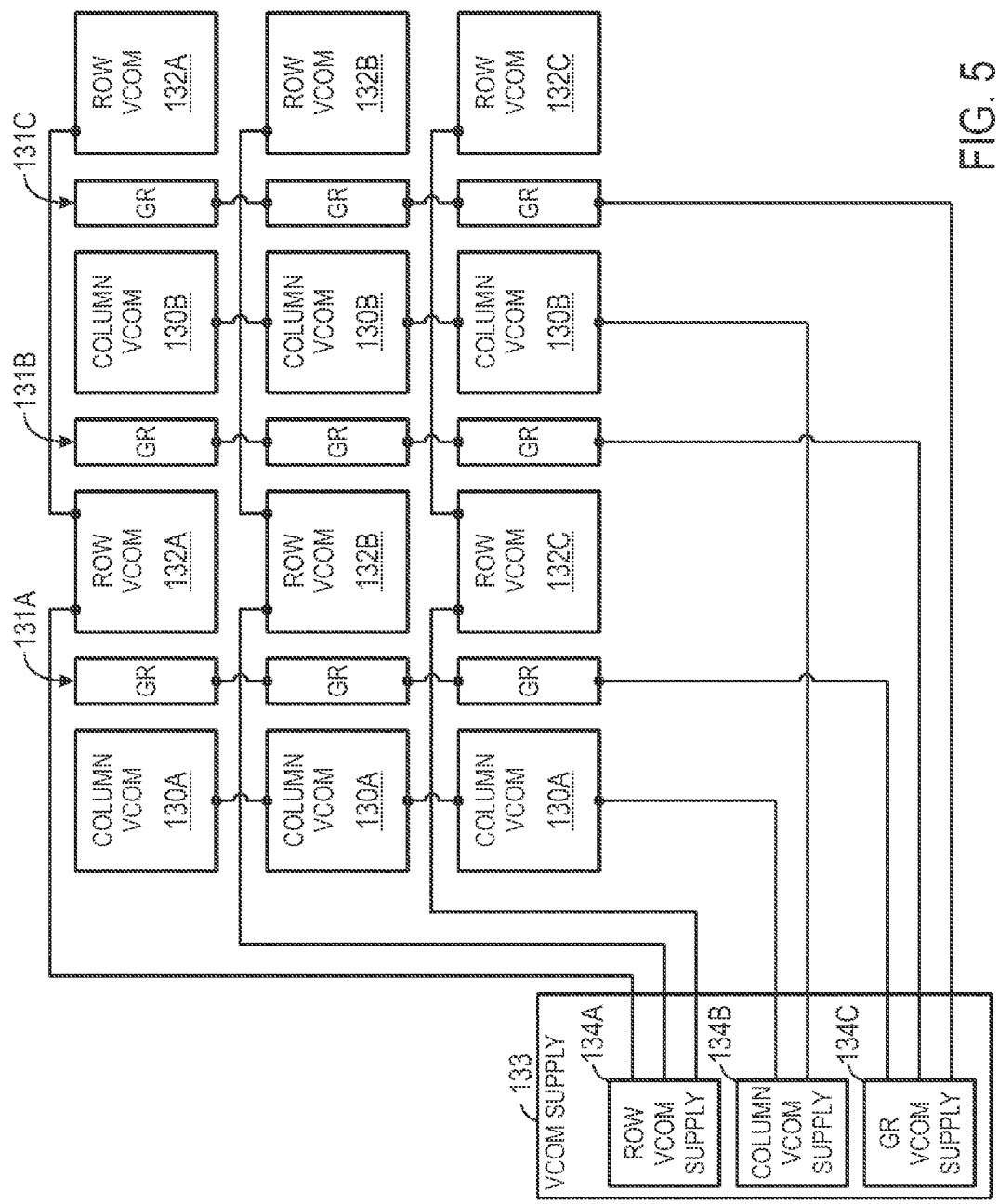
FIG. 5 is a block diagram of multiple common voltage layers (VCOMs) of the LCD, in accordance with an embodiment.

As seen in FIG. 5, the common voltage layers (VCOMs) that make up the common electrodes 112 may include column VCOMs 130, guard rail VCOMs 131, and row VCOMs 132. Although FIG. 5 shows only two column VCOMs 130A and 130B, three guard rail VCOMs 131, and two row VCOMs 132, an actual implementation of the display may include any suitable number of these components. A VCOM power supply 133 may supply power to the various VCOMs individually. Thus, a row VCOM supply 134A may supply power to the row VCOMs 132, a column VCOM supply 134B may supply power to the column VCOMs 130, and a guard rail VCOM supply 134C may supply power to the guard rail VCOMs 131.

Supplying power to the various VCOMs separately may allow the column VCOMs 130, guard rail VCOMs 131, and row VCOMs 132 to gather touch sense information when operating in a touch mode of operation. Specifically, though the column VCOMs 130, guard rail VCOMs 131, and row VCOMs 132 may be supplied the same direct current (DC) bias voltage, different alternating current (AC) voltages may be supplied and/or received on them at different times. Thus, the display 18 may be configured to switch between two modes of operation: a display mode and a touch mode. In the display mode, the row and column VCOMs 130, 132 operate in the aforementioned manner, in which an electric field is generated between the column and row VCOMs 130 and 132 and respective pixel electrodes 110. The electric field modulates the liquid crystal layer to let a certain amount of light pass through the pixel. Thus, an image may be displayed on the display 18 in the display mode. In the touch mode, the row VCOM 132 and the column VCOM 130 may be configured to sense a touch on the display 18. In certain embodiments, a stimulus signal or voltage may be provided by the row VCOM 132. The column VCOM 130 may be configured to receive a touch signal and output the data to be processed by the processor(s) 12. The touch signal may be generated when an operator touches the display 18 and capacitively couples with a portion of the row VCOM 132 and a portion of the column VCOM 130. Thus, the portion of the column VCOM 130 may receive a signal indicative of a touch.

Since the various VCOMs 130, 131, and 132 are electrically separated and may have different loading characteristics in relation to the gate lines 104, it is possible for one of the VCOMs 130, 131, and 132 to become biased more or less than another. This may produce mura artifacts on pixels along the rows and/or columns. When the display 18 operates according to certain operating parameters 129, however, mura artifacts may be substantially reduced or eliminated.

Figure 6:
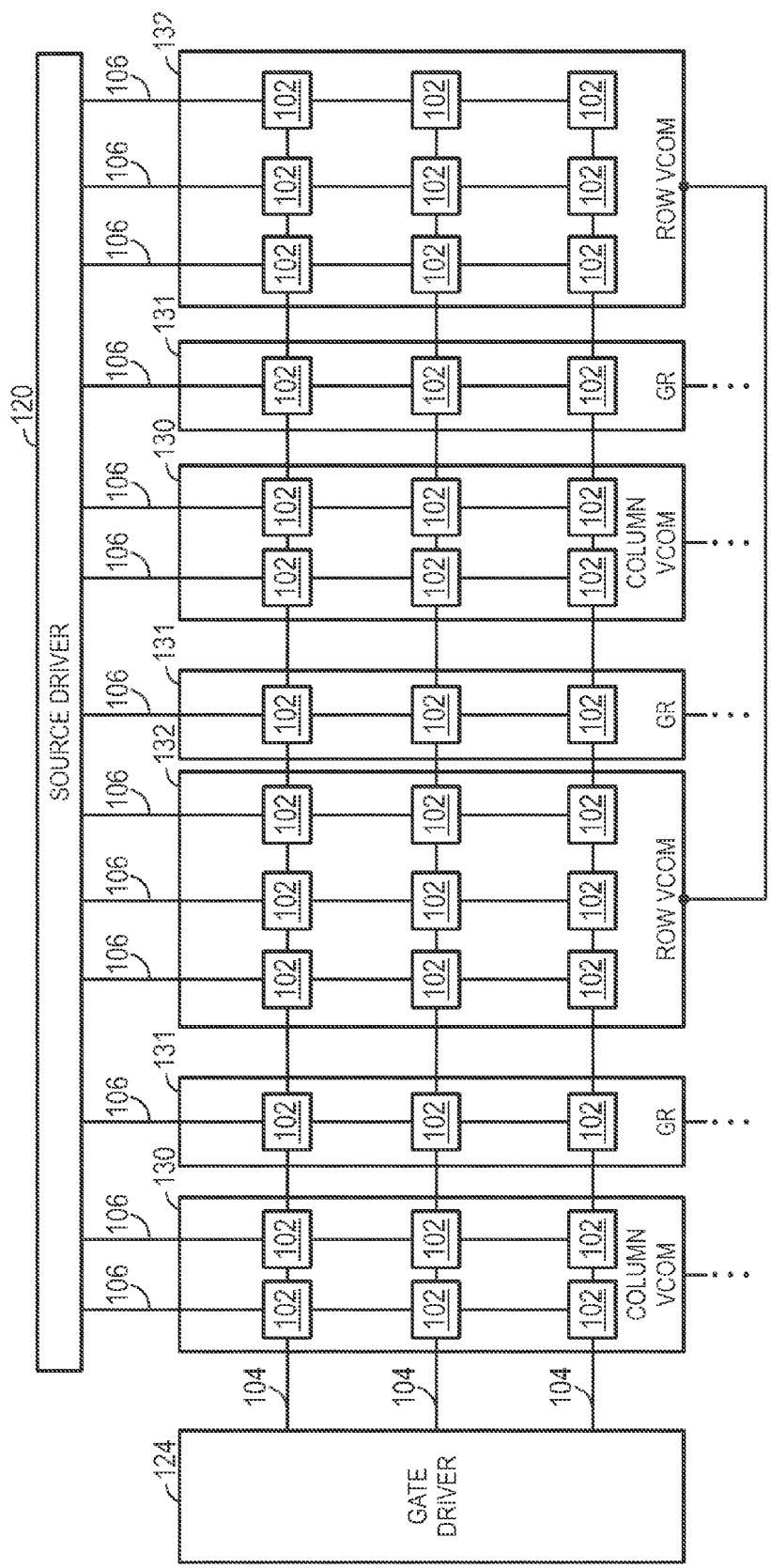
FIG. 6 is a block diagram illustrating pixels of the LCD in relation to the VCOMs, in accordance with an embodiment.

The pixels 102 may be associated with different of these VCOMs 130, 131, or 132, as seen in FIG. 6. The arrangement of FIG. 6 is meant to be a block diagram and any suitable number of pixels may actually be present on the different VCOMs 130, 131, and 132. For example, the column VCOM 130 may include 50, 51, 52, 53, 54, 55, 56, 57, 58, 59, 60, 61, 62, 63, 64, 65, 66, 67, 68, 69, or 70 or more or fewer pixels 102. The guard rail (GR) VCOM 131 may include 1, 2, 3, 4, 5, 6, 7, 8 or more pixels 102. The row VCOM 132 may include 50, 51, 52, 53, 54, 55, 56, 57, 58, 59, 60, 61, 62, 63, 64, 65, 66, 67, 68, 69, or 70 or more or fewer pixels 102.

As the gate driver 124 supplies gate line signals along the gate lines 104, the pixels 102 may become activated. As the pixels 102 become activated, the source driver 120 may supply data signals along the source lines 106 to program the pixels 102, as generally discussed above. If the VCOMs 130, 131, and 132 were all connected, the activation signals on the gate lines 104 would perturb the VCOMs 130, 131, and 132 equally. In arrangement shown in FIG. 6, however, the VCOMs 130 and 131 and the VCOMs 132 respectively have different loading characteristics in relation to the gate lines. Indeed, the columnated VCOMs 130 and 131 may be less affected by the activation signals of the gate lines 104 on a per-pixel basis than the row VCOMs 132. These discrepancies could produce a mura artifact unless the operating parameters 129 are calibrated to reduce or eliminate the mura artifact.

Operating Parameters

Any suitable operating parameters 129 may be adjusted to reduce or eliminate mura artifacts on the display 18. Among other things, the operating parameters 129 may include a gate clock overlap, a gate clock fall time, a source output parking voltage, and/or a differential resistance on the various VCOMs 130, 131, and/or 132. The adjustment of these various operating parameters 129 will be discussed further below.

Gate Clock Overlap and Gate Clock Fall Time

Adjusting gate clock overlap and gate clock fall time may reduce or eliminate muras. The adjustment of gate clock overlap and/or gate clock fall time will be described below, and may also be described in U.S. patent application Ser. No. 13/479,066, "DEVICES AND METHODS FOR REDUCING A VOLTAGE DIFFERENCE BETWEEN VCOMS OF A DISPLAY," which was filed on May 23, 2012, is assigned to Apple, Inc., and is incorporated by reference herein in its entirety. It should be appreciated that the examples that follow may be employed in a variety of suitable permutations. For instance, though the gate clock fall time and gate clock overlap examples described below vary over time, the gate clock fall time and gate clock overlaps may instead may not change once the gate clocks begin. Nevertheless, it is understood that these permutations should be easily made and used based on the following disclosure.

Figure 7:
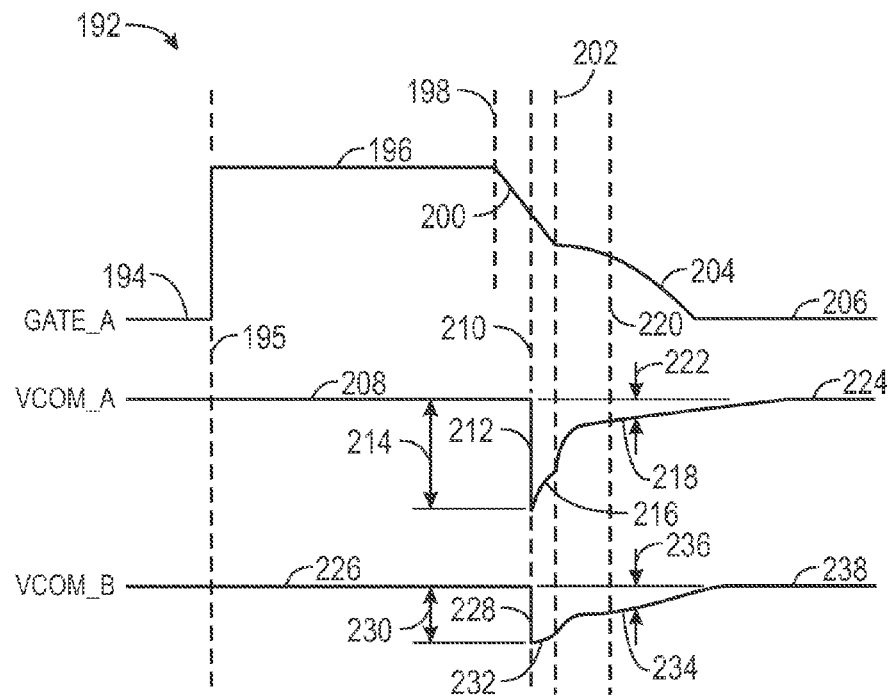
FIG. 7 is a timing diagram illustrating a gate clock fall time and its impact on the VCOMs, in accordance with an embodiment.

FIG. 7 relates to adjusting a gate clock fall time to decrease the voltage difference between VCOMs, thereby reducing the mura artifact. FIG. 7 illustrates one embodiment of a timing diagram 192 that shows a reduction of the voltage difference 142 between VCOMs of the display 18 by controlling a rate that a voltage on a gate line 104 is removed from pixels 102 to improve image quality of the display 18. As illustrated by segment 194, the gate line 104 may start in a logic low (deactivated) state. At a time 195, the gate line 104 may transition to a logic high (activated) state where it remains through segment 196. At a time 198, the gate line 104 may begin to transition toward the logic low state at a fixed rate, during segment 200. The fixed rate of transition may be a rate configured to be applied for a fixed period of time (e.g., until a time 202). At the time 202, the transition rate toward the logic low state may become variable (e.g., actively controlled) and may be based on the voltage difference 142, in order to decrease the voltage difference 142 between a column VCOM 130 and a row VCOM 132, as shown by segment 204. After the gate line 104 reaches the logic low state, the gate line 104 remains in the logic low state, as shown by segment 206.

In this embodiment, a voltage is applied to the column VCOM 130 during segment 208. At a time 210, a voltage perturbation alters the voltage of the column VCOM 130, as shown by segment 212. As illustrated, the voltage of the column VCOM 130 may change by a voltage 214. The voltage of the column VCOM 130 then begins to return to the voltage applied during segment 208, as shown by segments 216 and 218. Segment 216 corresponds to the rate that the gate line 104 is deactivated during segment 200, while segment 218 corresponds to the rate that the gate line 104 is deactivated during segment 204. At a time 220, the voltage of the column VCOM 130 may vary from the voltage applied during segment 208 by a voltage 222. During segment 224, the voltage of the column VCOM 130 may be approximately the same as the voltage applied during segment 208.

A voltage is applied to the row VCOM 132 during segment 226. At the time 210, a voltage perturbation alters the voltage of the row VCOM 132, as shown by segment 228. As illustrated, the voltage of the row VCOM 132 may change by a voltage 230. The voltage of the row VCOM 132 then begins to return to the voltage applied during segment 226, as shown by segments 232 and 234. Segment 232 corresponds to the rate that the gate line 104 is deactivated during segment 200, while segment 234 corresponds to the rate that the gate line 104 is deactivated during segment 204. At the time 220, the voltage of the row VCOM 132 may vary from the voltage applied during segment 226 by a voltage 236. During segment 238, the voltage of the row VCOM 132 may be approximately the same as the voltage applied during segment 226.

In certain embodiments, the voltage applied to the column VCOM 130 and the row VCOM 132 may be approximately the same and, therefore, the voltage difference 142 between the column VCOM 130 and the row VCOM 132 during segments 208 and 226 may be approximately zero. Furthermore, the voltage difference 142 between the column VCOM 130 and the row VCOM 132 at the time 212 may be approximately the difference between the voltage 214 and the voltage 230. As previously described, such a voltage difference 142 may decrease the quality of an image on the display 18. Accordingly, by controlling the rate that the activation signal is removed from the pixels 102 (e.g., via the gate line 104) to decrease the voltage difference 142, the mura artifact may be reduced or eliminated. For example, the voltage difference 142 may be reduced from its value at time 210 to a voltage difference 142 of the difference between the voltage 222 and the voltage 236 at the time 220. Further, during segments 224 and 238, the voltage difference 142 may be reduced to approximately zero.

Figure 8:
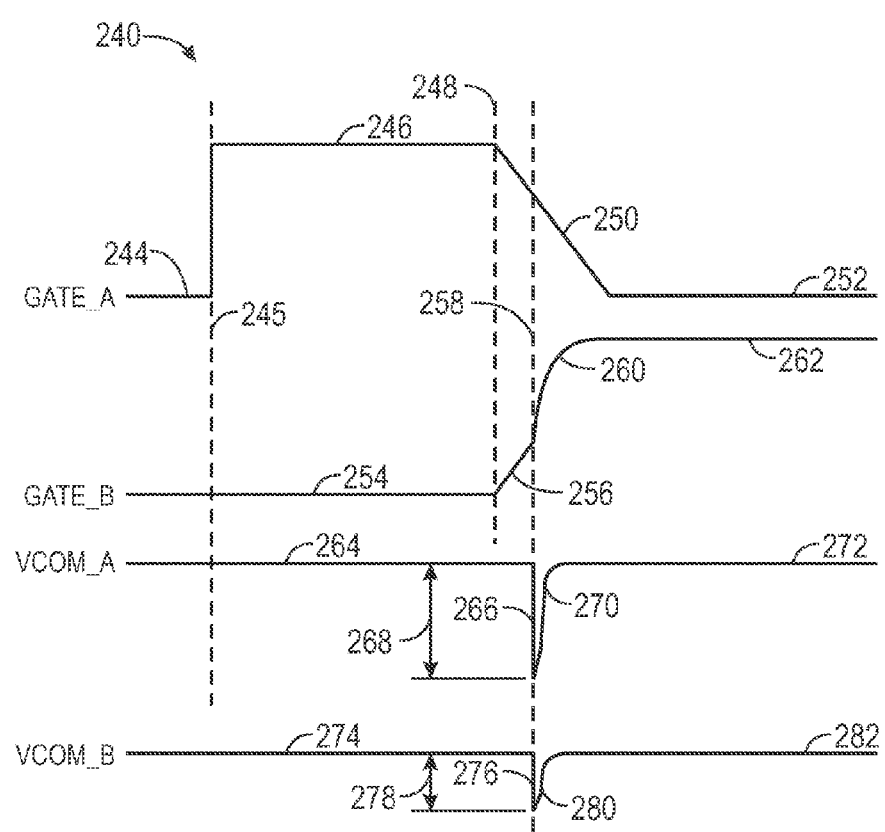
FIG. 8 is a timing diagram illustrating a gate clock overlap and its impact on the VCOMs of the LCD, in accordance with an embodiment.

In some embodiments, the time that an activation signal is applied to pixels 102 is controlled to decrease the voltage difference between VCOMs. This may be referred to as gate clock overlap. FIG. 8 illustrates one embodiment of a timing diagram 240 that shows a reduction of the voltage difference 142 between VCOMs of the display 18 by controlling a time that a voltage on a second gate line 104 (e.g., GATE_B) is applied to pixels 102 to improve image quality of the display 18. As illustrated by segment 244, the first gate line 104 (e.g., GATE_A) may start in a logic low (deactivated) state. At a time 245, the first gate line 104 may transition to a logic high (activated) state where it remains through segment 246. At a time 248, the gate line 104 may transition toward the logic low state at a fixed rate, during segment 250. After the first gate line 104 reaches the logic low state, the first gate line 104 remains in the logic low state, as shown by segment 252.

As illustrated by segment 254, the second gate line 104 (e.g., GATE_B) may start in a logic low (deactivated) state. At the time 248, the second gate line 104 may transition toward a logic high (activated) state at a fixed rate, as shown by segment 256. The fixed rate of transition may be a predetermined rate configured to be applied for a fixed period of time (e.g., until a time 258). At the time 258, the transition rate toward the logic high state may become variable (e.g., actively controlled) and may be based on the voltage difference 142, in order to decrease the voltage difference 142 between the column VCOM 130 and the row VCOM 132, as shown by segment 260. After the second gate line 104 reaches the logic high state, the second gate line 104 remains in the logic high state, as shown by segment 262.

In this embodiment, a voltage is applied to the column VCOM 130 during segment 264. At the time 258, a voltage perturbation alters the voltage of the column VCOM 130, as shown by segment 266. As illustrated, the voltage of the column VCOM 130 may change by a voltage 268. The voltage of the column VCOM 130 then returns to the voltage applied during segment 264, as shown by segment 270. Segment 270 corresponds to the rate that the second gate line 104 is activated during segment 260. During segment 262, the voltage of the column VCOM 130 may be approximately the same as the voltage applied during segment 264.

A voltage is applied to the row VCOM 132 during segment 274. At the time 258, a voltage perturbation alters the voltage of the row VCOM 132, as shown by segment 276. As illustrated, the voltage of the row VCOM 132 may change by a voltage 278. The voltage of the row VCOM 132 then returns to the voltage applied during segment 274, as shown by segment 280. Segment 280 corresponds to the rate that the second gate line 104 is activated during segment 260. During segment 282, the voltage of the row VCOM 132 may be approximately the same as the voltage applied during segment 274.

In certain embodiments, the voltage applied to the column VCOM 130 and the row VCOM 132 may be approximately the same and, therefore, the voltage difference 142 between the column VCOM 130 and the row VCOM 132 during segments 264 and 274 may be approximately zero. Furthermore, the voltage difference 142 between the column VCOM 130 and the row VCOM 132 at the time 258 may be approximately the difference between the voltage 268 and the voltage 278. As previously described, such a voltage difference 142 may decrease the quality of an image on the display 18. Accordingly, the display 18 uses this voltage difference 142 to control the rate and/or timing that the activation signal is applied to the pixels 102 (e.g., via the second gate line 104) to decrease the voltage difference 142. Specifically, during segment 260 of the second gate line 104, the display 18 uses the voltage difference 142 between the column VCOM 130 and the row VCOM 132 to change the rate that the activation signal is applied to the pixels 102. For example, the voltage difference 142 is reduced from its value at time 258 to a voltage difference 142 of approximately zero during segments 272 and 282.

The examples of FIGS. 7 and 8 may generally describe adjusting the gate clock overlap and gate clock fall time as a function of the voltage difference between various VCOMs. However, it should be appreciated that the gate clock overlap and gate clock fall time may be calibrated at one time and the values of which stored as the operating parameters 129 in the storage 16 of the electronic device 10 and/or some nonvolatile memory of the display 18. That is, rather than dynamically change the gate clock overlap and gate clock fall time operating parameters 129, these values may be set as static values selected to reduce or eliminate mura artifacts. These values may be adjusted according to the various techniques discussed further below.

Source Output Parking Voltage

Another operating parameter 129 that may be adjusted and programmed into the storage 16 and/or nonvolatile storage 128 is a source output parking voltage. Source output parking voltage refers to a voltage remaining on the source lines 106 when the display 18 temporarily operates in the touch mode rather than the display mode. In particular, it is believed that adjusting the source output parking voltages of the display 18 may adjust the leakage currents of the pixels 102. Adjusting the leakage current of the pixels 102 may, in turn, adjust the visibility of the mura artifact of the display 18. A further discussion of source output parking voltages may be found in U.S. Provisional Patent Application Ser. No. 61/657,667, "DEVICES AND METHODS FOR IMPROVING IMAGE QUALITY IN A DISPLAY HAVING MULTIPLE VCOMS," filed on Jun. 8, 2012, assigned to Apple, Inc., and incorporated by reference herein in its entirety. Examples describing the effect of adjusting the source output parking voltage are provided with reference to FIGS. 10 and 11.

Figure 9:
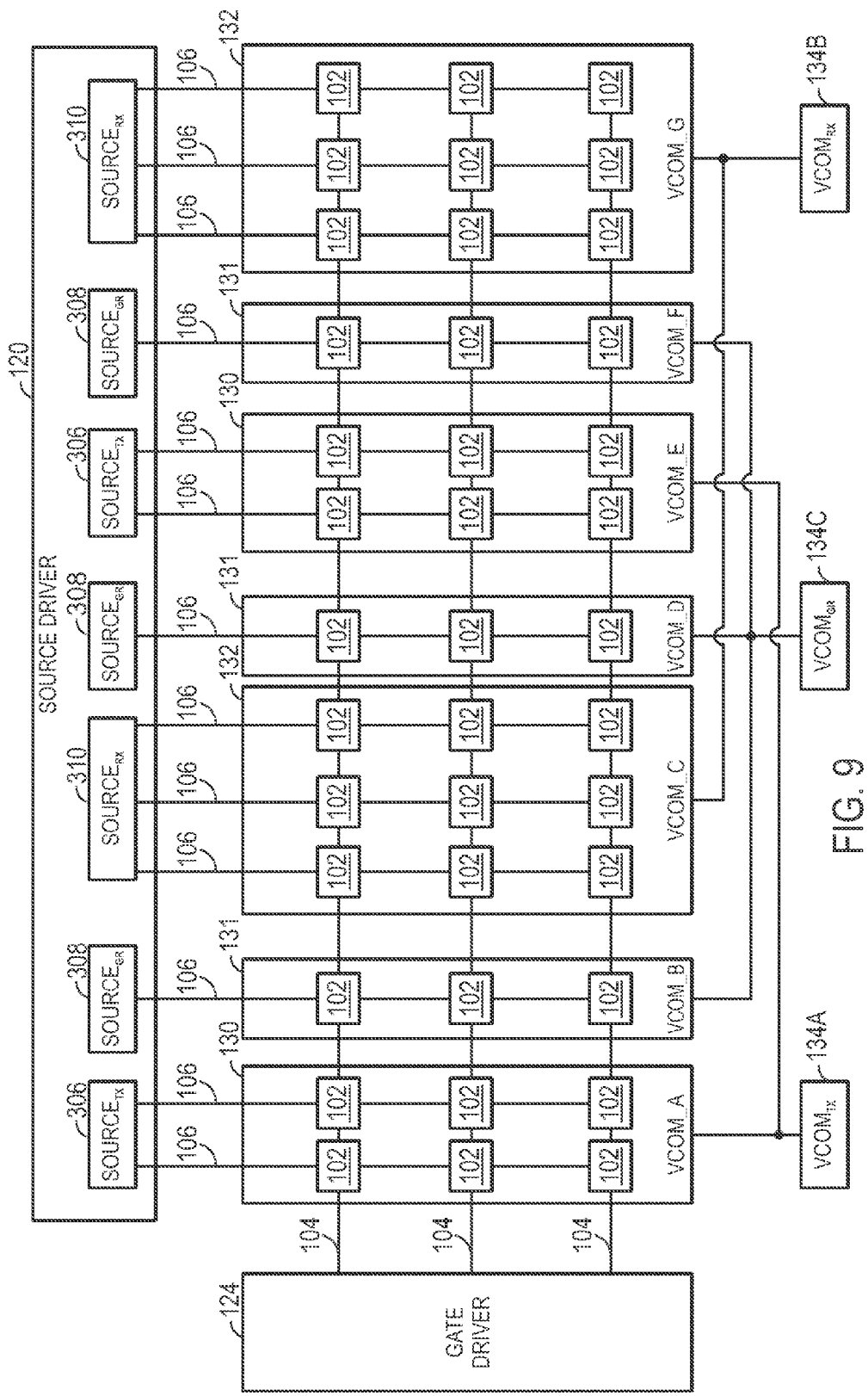
FIG. 9 is a block diagram of circuitry for controlling a source output parking voltage to improve image quality of the LCD, in accordance with an embodiment.

Namely, FIG. 9 generally represents one embodiment of a circuit diagram of components of the electronic device 10 for applying different signals to different VCOMs of the display 18 having multiple VCOMs to improve image quality of the display 18. In particular, the electronic device 10 includes a column VCOM 130, a VCOM_B 131, a VCOM_C 132, a VCOM_D 131, a VCOM_E 130, a VCOM_F 131, and a VCOM_G 132. As illustrated, the column VCOM 130, the VCOM_B 131, the VCOM_C 132, the VCOM_D 131, the VCOM_E 130, the VCOM_F 131, and the VCOM_G 132 each have multiple pixels 102 coupled thereon. As may be appreciated, the VCOMs may have any number of pixels 102 coupled thereon. Furthermore, there may be any suitable number of VCOMs of the display 18. It should be noted that the common electrodes 112 of the illustrated pixels 102 may be electrically coupled to their respective VCOM.

In certain embodiments, the VCOMs of the display 18 may be arranged into rows and columns. The rows and columns of the VCOMs may be used during a touch mode of the display for sensing touches of the display. For example, a touch driving signal (e.g., a low voltage AC signal) may be supplied to one or more rows of VCOMs. While the signal is supplied, a touch may be sensed using one or more columns of VCOMs. In this embodiment, the column VCOM 130 and the VCOM_E 130 may be part of a row of VCOMs. Accordingly, the column VCOM 130 and the VCOM_E 130 may be electrically coupled together. Furthermore, the column VCOM 130 and the VCOM_E 130 may be electrically coupled to a $VCOM_{TX}$ 134A configured to provide a touch driving signal to the row of VCOMs. As may be appreciated, the display 18 may include one or more $VCOM_{TX}$ 134A to drive the rows of VCOMs of the display 18.

The VCOM_C 132 and the VCOM_G 132 may be part of the columns of VCOMs of the display 18. For example, the VCOM_C 132 may be part of one column of VCOMs and the VCOM_G 132 may be part of another column of VCOMs. As illustrated, the VCOM_C 132 and the VCOM_G 132 may be electrically coupled together. Furthermore, the VCOM_C 132 and the VCOM_G 132 may be electrically coupled to a $VCOM_{RX}$ 134B configured to sense a touch of the display 18. As may be appreciated, the display 18 may include one or more $VCOM_{RX}$ 134B to sense touches of the display 18. For example, the display 18 may include one $VCOM_{RX}$ 134B for each column of VCOMs.

The display 18 may include VCOMs that function as guard rails configured to inhibit direct capacitive coupling (e.g., without a touch such as from a finger) from occurring between the rows and columns of VCOMs. As illustrated, the VCOM_B 131, the VCOM_D 131, and the VCOM_F 131 may all be guard rails. As illustrated, the VCOM_B 131, the VCOM_D 131, and the VCOM_F 131 may be electrically coupled together. Furthermore, the VCOM_B 131, the VCOM_D 131, and the VCOM_F 131 may be electrically coupled to a $VCOM_{GR}$ 134C. As may be appreciated, the display 18 may include one or more $VCOM_{GR}$ 134C that may provide signals to the guard rails.

The gate driver 124 is coupled to the gate lines 104 for activating and/or deactivating the gates 116 of the TFTs 108 of the pixels 102. Furthermore, the source driver 120 is coupled to the source lines 106 for supplying data signals to the sources 114 of the TFTs 108 of the pixels 102. As may be appreciated, the source driver 120 may supply data signals to pixels 102 based on the VCOM that the pixels 102 are coupled to. For example, the source driver 120 may supply data signals of a first voltage to pixels 102 of VCOM rows (e.g., $SOURCE_{TX}$ 306). Furthermore, the source driver 120 may supply data signals of a second voltage to pixels 102 of VCOM guard rails (e.g., $SOURCE_{GR}$ 308). Moreover, the source driver 120 may supply data signals of a third voltage to pixels 102 of VCOM columns (e.g., $SOURCE_{RX}$ 310). Although the $SOURCE_{TX}$ 306, the $SOURCE_{GR}$ 308, and the $SOURCE_{RX}$ 310 are illustrated as being part of the source driver 120, it should be noted that the $SOURCE_{TX}$ 306, the $SOURCE_{GR}$ 308, and the $SOURCE_{RX}$ 310 are illustrated to show that different signals may be supplied to different VCOMs of the display 12 and not that there are necessarily such devices within the source driver 120.

As illustrated, the column VCOM 130, the VCOM_B 131, the VCOM_C 132, the VCOM_D 131, the VCOM_E 130, the VCOM_F 131, and the VCOM_G 132 may not physically be the same size. Accordingly, the column VCOM 130, the VCOM_B 131, the VCOM_C 132, the VCOM_D 131, the VCOM_E 130, the VCOM_F 131, and the VCOM_G 132 may have resistive differences. In certain embodiments, the column VCOM 130 and the VCOM_E 130 may be approximately the same size. Furthermore, the VCOM_C 132 and the VCOM_G 132 may be approximately the same size. Moreover, the VCOM_B 131, the VCOM_D 131, and the VCOM_F 131 may be approximately the same size.

Figure 10:
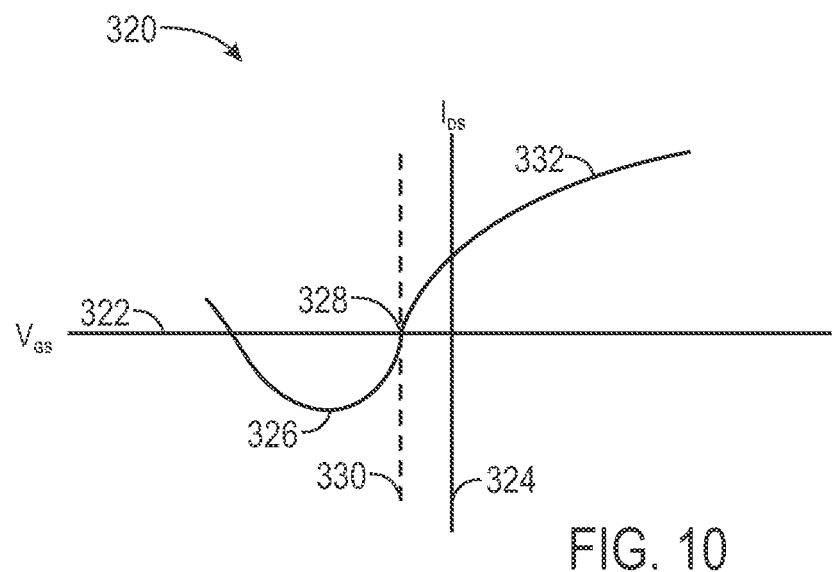
FIG. 10 is an I-V curve showing leakage currents of a thin film transistor (TFT) of a pixel of the LCD that may be adjusted using the source parking voltages as shown in FIG. 9.

During operation, the display 18 may alternate between a display mode and a touch mode. During the display mode, the display 18 receives image data and provides data signals to pixels 102 to store the image data on the pixels 102. During the touch mode, the display 18 provides a touch driving signal and senses touches that occur. As may be appreciated, when the touch driving signal is applied to the display 18, a gate-to-source voltage of the TFTs 108 of the pixels 102 may be modified, which may result in an increased leakage current (e.g., drain-to-source current) of the TFTs 108. FIG. 10 is a diagram 156 illustrating a relationship between a gate-to-source voltage 158 of a TFT 108 and a drain-to-source current 160 of the TFT 108.

Specifically, the drain-to-source current 160 is negative during a segment 162. At the end of segment 162, the drain-to-source current 160 reaches zero, at point 164. The gate-to-source voltage 158 at point 164 is indicated by a voltage 166, which is a negative voltage. During a segment 168, the drain-to-source current 160 is positive. Accordingly, if the gate-to-source voltage 158 were to fluctuate about the axis 160 based on a touch driving signal (e.g., a low voltage AC signal), the drain-to-source current 160 would fluctuate between a low positive value and a high positive value, resulting in a potential for high leakage, which in turn may decrease the quality of the image of the display 18. However, if the gate-to-source voltage 158 were to fluctuate about an axis formed by the voltage 166, the drain-to-source current 160 would fluctuate between a low negative value and a low positive value, resulting in lower leakage and improving the quality of the image of the display 18. Accordingly, voltages are applied to the source lines 106 to change the gate-to-source voltage 158 and thereby shift the axis related to the drain-to-source current 160 fluctuations.

In certain embodiments, voltages may be applied to the source lines 106 as part of the display mode and remain applied during the touch mode until the display mode resumes. Specifically, data may be stored on the pixels 102 of the display 18 line by line during the display mode until all lines of pixels 102 have data stored on them. For example, if the display 18 were to have 960 lines of pixels 102, during the display mode all 960 lines of pixels 102 may have data stored on them. In certain embodiments, as part of the display mode, the display 18 may act as if it contains a 961st line of pixels 102 (e.g., a virtual line). For the 961st line of pixels 102, voltages are applied to the source lines 106 just as when other lines of pixels 102 store data; however, the gate lines 104 are not activated (e.g., remain deactivated) so that data is not stored on the pixels 102. Furthermore, the voltages applied to the source lines 106 remain after the display mode ends and through the touch mode until the display mode begins again. As such, the voltages applied to the source lines 106 may be considered "parked."

As previously discussed, the voltages applied to the source lines 106 may vary based on the VCOMs that the source lines 106 provide signals to. The voltages may vary in order to tune each set of pixels 102 coupled to a single VCOM so that the TFTs 108 of the VCOM have a minimum amount of leakage current. The difference in voltage between different VCOMs may be due in part to the size of the VCOMs, the number of pixels 102 coupled to the VCOMs, and so forth. In one embodiment, the voltage applied to the source lines represented by $SOURCE_{TX}$ 306 may be approximately a gray 255 voltage, the voltage applied to the source lines represented by $SOURCE_{GR}$ 308 may be approximately a gray 127 voltage, and the voltage applied to the source lines represented by $SOURCE_{RX}$ 310 may be approximately a gray 0 voltage. In another embodiment, the voltage applied to the source lines represented by $SOURCE_{TX}$ 306 may be approximately a gray 255 voltage, the voltage applied to the source lines represented by $SOURCE_{GR}$ 308 may be approximately a gray 204 voltage, and the voltage applied to the source lines represented by $SOURCE_{RX}$ 310 may be approximately a gray 192 voltage. In other embodiments, the voltages applied to the source lines represented by $SOURCE_{TX}$ 306, $SOURCE_{GR}$ 308, and $SOURCE_{RX}$ 310 may be tuned to any suitable voltage. Accordingly, the leakage current of TFTs 108 of the pixels 102 may be reduced and the image quality of the display 18 may be improved.

The particular source output parking voltages applied may be selected and stored as operating parameters 129 in the storage 16 and/or the nonvolatile memory 128. With different source output parking voltages, the mura artifacts due to the different VCOMs may become more or less pronounced.

Differential VCOM Resistance

It is believed that the differential bias voltages that may occur on the different VCOMs may be due at least in part to different transient voltage perturbations that occur on the VCOMs. Changing the RC time constants of the VCOMs thus may impact these transient voltage perturbations. Thus, another of the operational parameters 129 of the display 18 that may be changed, in some embodiments, is a differential VCOM resistance value or differential capacitance value. It should be appreciated that, as used in this document, references to an operating parameter 129 relating to VCOM resistance should be understood to include, additionally or alternatively, varying VCOM capacitance. A further discussion of differential VCOM resistance may be found in U.S. Provisional Patent Application Ser. No. 61/657,671, "Differential VCOM Resistance or Capacitance Tuning for Improved Image Quality," filed on Jun. 8, 2012, assigned to Apple, Inc., and incorporated by reference herein in its entirety. The following discussion relating to FIGS. 12-14 will generally describe how the VCOM resistance may affect the appearance of mura artifacts.

Figure 11:
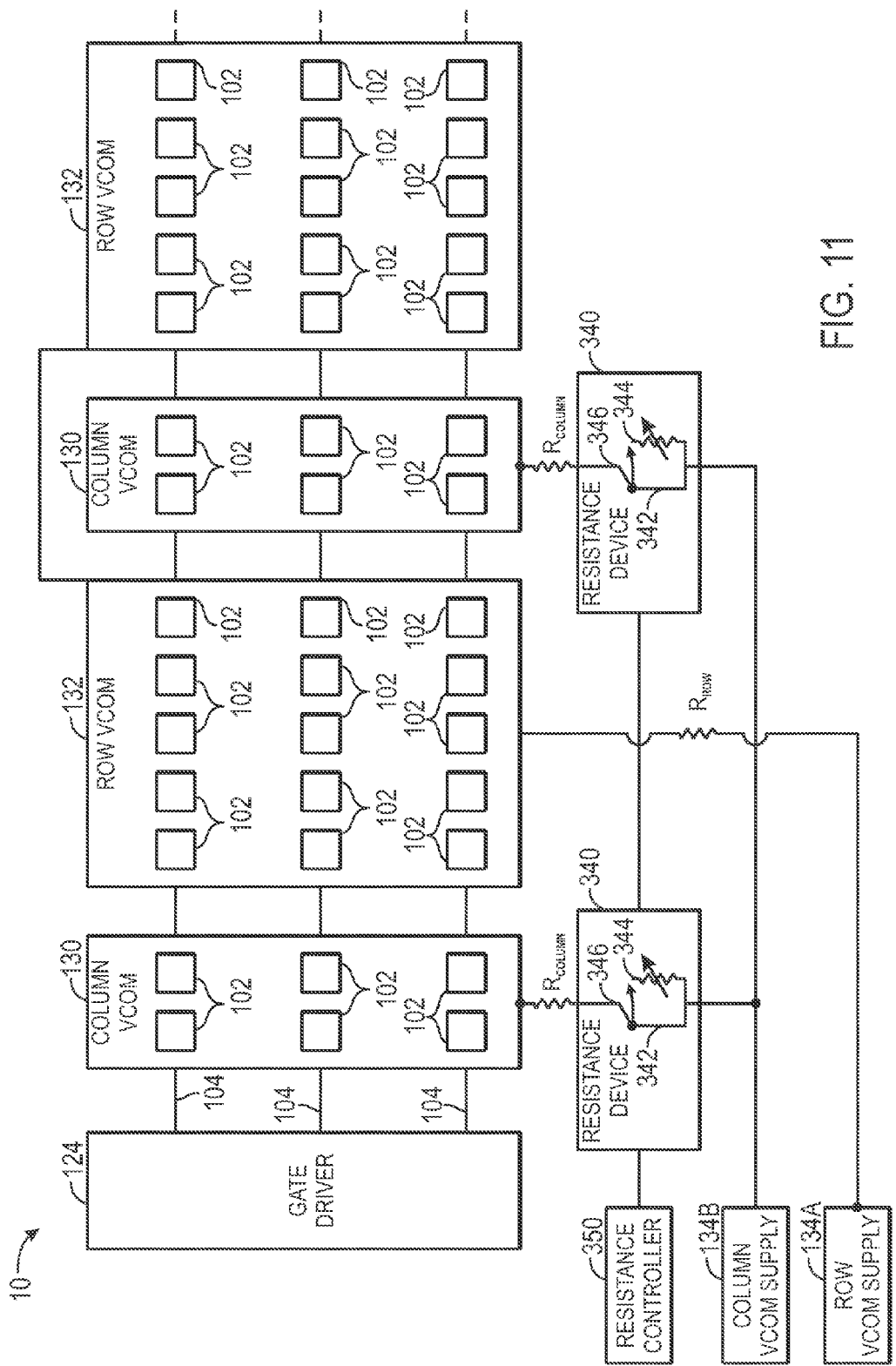
FIG. 11 is a block diagram illustrating circuitry for adjusting resistances of VCOMs of the LCD to improve image quality, in accordance with an embodiment.

As mentioned above, the display 18 may have any suitable number of VCOMs and the VCOMs may vary in size. FIG. 11 generally represents a diagram of circuitry of the electronic device 10 capable of reducing variation in voltage perturbation between the column VCOMs 130 and the row VCOMs 132 of the display to improve image quality of the display 18. Specifically, in this embodiment, the display 18 includes a column VCOM 130 and a row VCOM 132. Each of the column VCOM 130 and the row VCOM 132 may include a number of pixels 102, as shown. Further, the display 18 may include a number of row VCOMs 132 and a number of column VCOMs 130. The row VCOMs 132 may be coupled to each other via a line such that each row VCOM 132 shares the same voltage level. The column VCOMs 130 may be individually coupled to the VCOM source 134. Although not shown in FIG. 11, other VCOMs may also be present (e.g., "guard rail" VCOMs 131 between the column VCOMs 130 and the row VCOMs 132).

At least partially due to the configuration of the row VCOMs 132—namely, that the row VCOMs 132 are in line with the gate lines 104—the row VCOMs 132 may experience greater interference from voltage changes in the gate line 104 due to TFT gate deactivation. Since each of the column VCOMs 130 may extend down the display 18, and thus only shares a relatively small part its total area with a given gate line 104, the column VCOMs 130 may experience comparatively less. Moreover, the column VCOMs 130 and the row VCOMs 132 may have different inherent resistances (e.g., Rcolumn and Rrow) between respective voltage supplies 134B and 134A, as well as different capacitances between the gate lines 104 (e.g., Cgc values associated with the VCOMs 130 and 132). The effect of these different VCOM characteristics, as well as different amounts of exposure to the gate lines 104, may produce different voltage perturbations on the column VCOMs 130 and the row VCOMs 132.

Since different voltage perturbations could produce image artifacts, differences in voltage perturbations may be mitigated by adjusting the resistance(s). As will be discussed below, increasing the column VCOM 130 resistance may cause the corresponding time constant of the voltage perturbation on the column VCOM 130 to be extended. Ordinarily, increasing a resistance is considered problematic. Indeed, an increased resistance can result in lower power efficiency and increased heat waste. In this case, however, increasing the resistance may reduce or eliminate image artifacts.

As such, column VCOMs 130 may be coupled to a resistance device 340. In the example of FIG. 11, the resistance device 340 includes a non-resistive path 342 and a resistive path 344 selectable by a switch 346. A resistance controller 350 may cause the resistance device 340 to switch between the resistive path 344 and the non-resistive path 342. The resistance controller 350 may be a separate component of the display 18 or may be integrated into other components of the display 18 (e.g., display or touch driver circuitry). In some embodiments, the resistance controller 350 may switch to the resistive path 344 during a display mode and to the non-resistive path 342 during a touch screen mode of the display 18. In other embodiments, only a resistive path 344 may be employed. In these embodiments, the resistance controller 350 may be absent.

In any case, the resistive path 344 may add resistance using any suitable resistive elements. These may include a resistor of a single value, a resistor that may be set or programmed during the fabrication of the display 18, or a variable resistance device (e.g., a resistor ladder). Additionally or alternatively, the resistance device 340 may include a capacitor. Such a capacitor may vary the time constant of the column VCOMs 130 in a similar manner as the additional resistance. Moreover, the column VCOMs 130 may be coupled to different resistance devices 340 with different resistance values. In certain embodiments, some column VCOMs 130 may be coupled to resistance devices 340 and some column VCOMs 130 may not be coupled to resistance devices 340.

Moreover, in some embodiments, the resistance controller 350 may do more than just control the switching of the resistance device 340 between the resistive path 344 and the non-resistive path 342. Indeed, the resistance controller 350 may, additionally or alternatively, control the resistance of the resistive path 344. For example, the resistive device(s) of the resistive path 344 may be chosen to provide a range of possible resistance values. The resistance controller 350 may tune the resistance of the resistive path 344 to reduce or eliminate image artifacts caused by variations in voltage perturbation.

Figure 12:
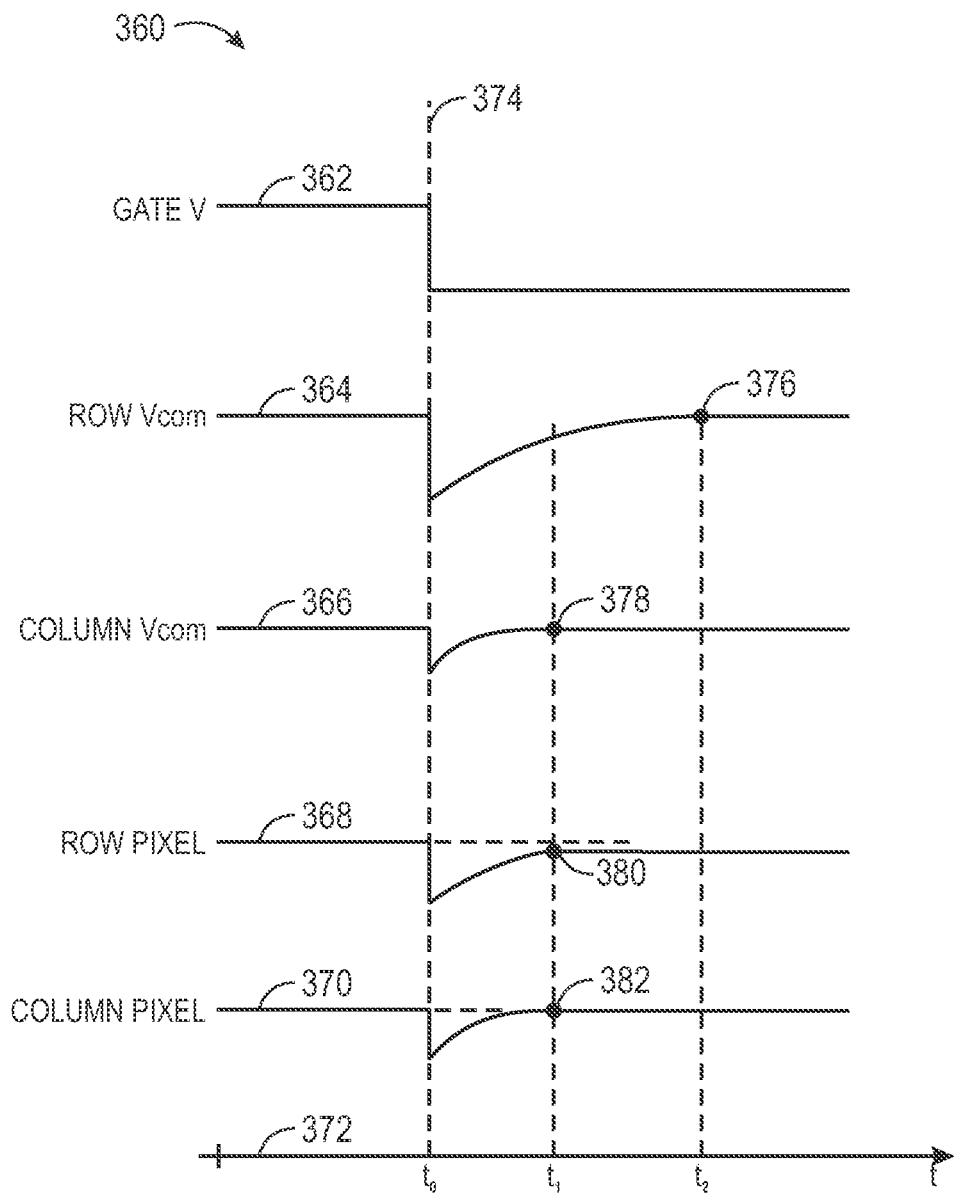
FIG. 12 is a timing diagram illustrating voltage changes in certain display elements caused by TFT gate deactivation when the resistances and/or capacitances of the VCOMs are not adjusted.
Figure 13:
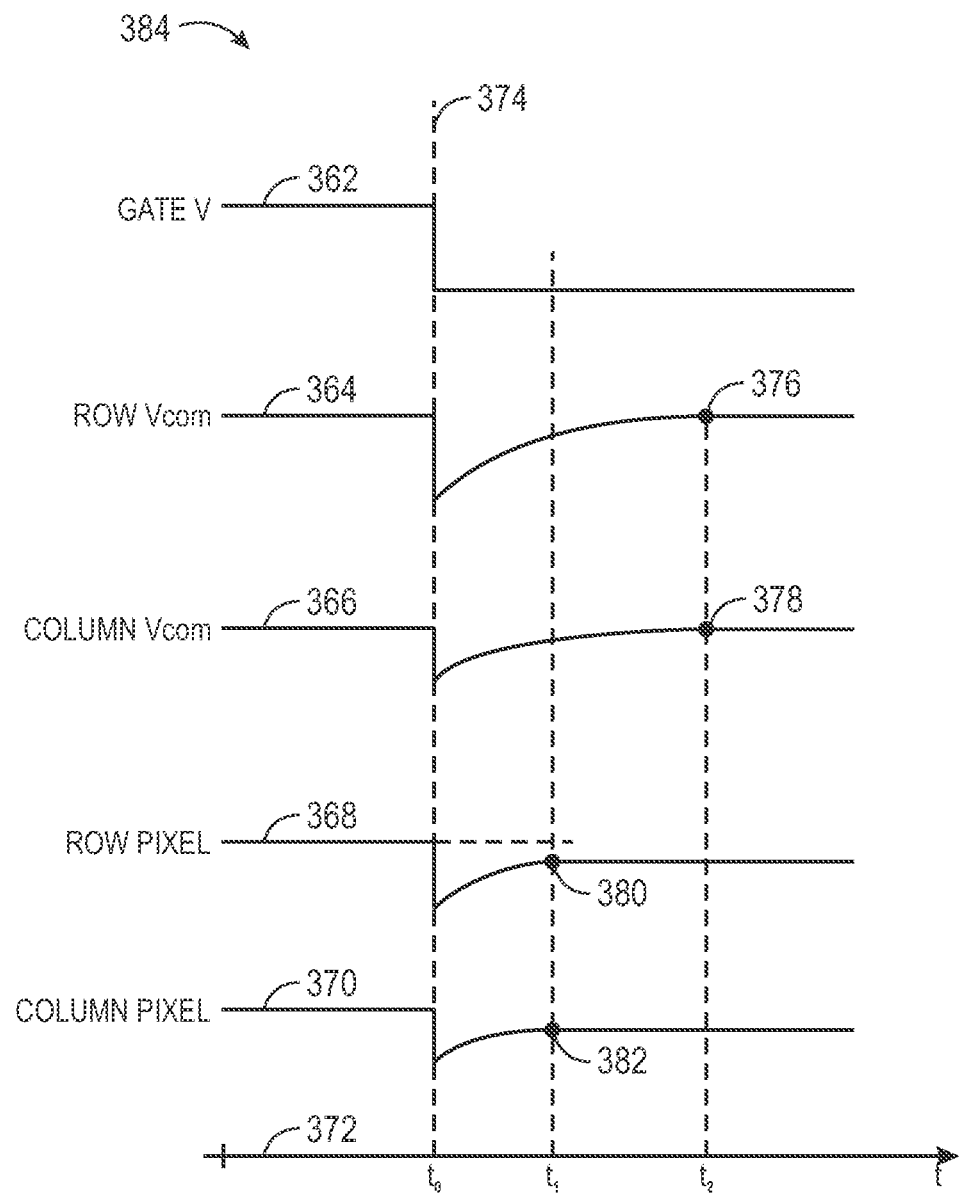
FIG. 13 is a timing diagram illustrating voltage changes in certain display elements caused by TFT deactivation after applying additional resistance and/or capacitances to certain VCOMs, thereby improving image quality, in accordance with an embodiment.

FIGS. 12 and 13 illustrate the effect of reducing the voltage perturbation differences between the column VCOMs 130 and the row VCOMs 132. Namely, FIG. 12 represents a timing diagram when this techniques are not applied, and FIG. 13 represents a timing diagram when this techniques are applied.

FIG. 12 illustrates voltage levels 360 of the row VCOM 132 and the column VCOM 132 in response to TFT gate deactivation with respect to time when an additional resistance on the column VCOM 130 is not employed. TFT gate deactivation is illustrated by a gate voltage curve 362, in which the voltage in the TFT gate line 104 drops at $t_0$, signifying the point of TFT gate deactivation 374. Accordingly, due to capacitive coupling between the gate line 104 and the VCOMs 130 and 132, a voltage of the row VCOM (line 364) may also exhibits a transient drop in voltage at $t_0$ as well. The row VCOM 132, due to its configuration and physical relation to the gate line, may experience a rise time of $t_2-t_0$ in order to return to its original voltage value at $t_2$ (point 376). A voltage in the column VCOM (line 366) may experience a less dramatic voltage drop at $t_0$, in response to TFT gate deactivation 374. As such, the column VCOM 130 may return to its original voltage (point 378) faster than the row VCOM 132, at $t_1$.

A voltage in the row pixel (line 368), which is coupled to the row VCOM 132, may experience a similar drop in voltage level. As such, the row pixel voltage 368, which generally determines how much light is shown by the pixel, would not return to its original value until $t_2$. In the example of FIG. 12, however, the TFT 108 may completely open and prevent any changes in any pixels 102 after time $t_1$. Thus, the row pixel voltage 368 does not ever fully return to its programmed value, but instead stops at the voltage level it has reached by time $t_1$ (point 380). Meanwhile, a voltage in the column pixel (line 370) may experience a voltage drop and rise time similar to that of the column VCOM (line 378). The column pixel thus may return to its original value (point 382) at $t_1$. That is, the column pixel (line 370) may return to its original value faster than the row pixel (line 368). As a result, the variation in voltage perturbation between row VCOM (line 364) and column VCOM (line 366) may result in different programmed values in row pixels (point 380) and column pixels (point 382) even when the values should be the same. This may be seen on the display 18 as vertical striping artifacts when the column VCOMs 130 extend vertically down the display 18.

The rise time of the column pixel (line 370) may be altered by altering the resistance of the column VCOM 130. Specifically, the rise time of the column VCOM 130, and thus column pixel, may be increased by increasing the resistance of the column VCOM 130. As such, the resistance device 340 described above and illustrated in FIG. 11 may be chosen or tuned to a resistance that increases the rise time of the column VCOM to match that of the row VCOM. Thus, the variation in voltage perturbation between the column pixel and the row pixel caused by TFT deactivation may be largely reduced and/or eliminated.

FIG. 13 illustrates the voltage levels 384 of the row VCOM (line 364) and the column VCOM (line 366), in which the column VCOM 130 is coupled to the resistance device 340 shown in FIG. 12. As illustrated, the gate voltage (line 362) drops at the point of TFT gate deactivation 374. Likewise, the row VCOM voltage (line 364) and column VCOM voltage (line 366) drop as well, due to the capacitive coupling between the VCOMs 130 and 132 and the gate line 104. The row VCOM 132 experiences a rise time of $t_2$ in order to return to its original voltage (point 376). The column VCOM 130, due to it its added resistance from the resistance device 340, may also experience a rise time of $t_g$ in order to return to its original voltage level (point 378). Accordingly, the row pixel voltage (line 368) and column pixel voltage (line 382) experience correspondingly similar rise times in response to TFT gate deactivation. In some embodiments, the voltage drops may also be similar, but may not be in all cases. As such, both the row pixel voltage (line 370) and the column pixel voltage (line 382) may be stopped at the same voltage level when the TFT 108 completely opens and the row pixels (line 368) and column pixels (line 370) stabilize. Thus, display errors and artifacts attributed to variation in voltage perturbation between row VCOMs 132 and column VCOMs 130 may be largely reduced and/or eliminated.

As mentioned, the resistance device 340 may be switched on when the display is in display mode. In certain embodiments, the resistance controller 350 may detect that the display 18 is in the display mode. The resistance controller 350 may detect that the display 18 is in the display mode by sensing a signal indicative of the display 18 being in the display mode. The resistance controller 350 may connect the resistive path 344 in response to detecting the display mode. Thus, the column VCOM 130 may be coupled to the resistance path 344 and take on a higher resistance value. As discussed, this may allow the column VCOM 130 rise time to generally match that of the row VCOM 132. In other embodiments, this may allow the column VCOM 130 rise time to be lengthened such that the ultimate voltage programmed in the column pixels 102 is the same as that of the row pixels 102 when the same source or data voltage is provided.

Since the resistance device 340 may not be needed when the display 18 is in touch mode, the resistance controller 350 may be configured to detect when the display 18 is in the touch mode. As such, the resistance controller 166 may connect to the non-resistive path 342 in response to detecting the touch mode, decoupling the column VCOM 130 from the resistive path 344. The resistance controller 350 may continue to detect when the display 18 is in the display mode or touch mode, and switch the resistance device 340 accordingly.

In this way, variable resistances applied to the VCOMs of the display 18 (as stored as the operating parameters 129 in the nonvolatile memory 128) may reduce or eliminate mura artifacts. This and any other suitable operating parameters 129, including gate clock overlap, gate clock fall time, and/or source output parking voltage may be used to reduce or eliminate mura artifacts (e.g., VSFOMs) due to differential VCOM characteristics.

Calibration of the Display and Programming of the Operating Parameters

The various operational parameters discussed above may be adjusted to reduce or eliminate mura artifacts. For example, as described in a flowchart 400 of FIG. 14, the display 18 may calibrate itself by measuring internal voltage differences on the pixels 102 related to the mura artifacts. In particular, the display 18 first may be programmed such that all pixels are set to a gray level that produces contrasting mura artifacts (block 402). Any suitable gray level may be employed. It is believed that a gray level of G63 out of the range of possible gray levels of G0-G255 will produce the highest amount of contrast in these mura artifacts. In some embodiments, the gray level may be any value between gray levels of around G40 and G80, depending on the particular susceptibility of these gray levels to the mura artifacts. In some embodiments, the gray level selected may be less than G127. The pixels 102 may be programmed by the source driver circuitry 120 or through image data signals provided by the processor(s) 12.

Once the pixels 102 of the display 18 have been programmed with the gray level discussed above, the display 18 may activate the gates 116 of all or a subset of the pixels 102 (block 404). By opening the gates of the pixels 102, the voltages stored on the pixels 102 may become detectable. In particular, enough of the pixels 102 may be activated such that the sum of the capacitances of the pixels 102 will be high enough to enable the voltages to be measured. It may be appreciated that if only one pixel 102 where tested, the capacitance of that single pixel 102 might be insufficient to permit the voltage to be detected.

While the gate lines 104 are activating the pixels 102, allowing the voltages stored on the pixels 102 to be detectable, analog-to-digital conversion circuitry may obtain a digital value of the source line voltages (block 406). The digital voltage values—in particular, the voltage differences in different areas of the display 18—can indicate the presence and/or severity of the mura artifacts. Indeed, it is the voltage differences that produce lighter and darker areas of the display 18. Using the digital voltage values, the display 18 may determine operational parameters 129 to reduce or eliminate the mura artifacts (block 408).

Figure 14:
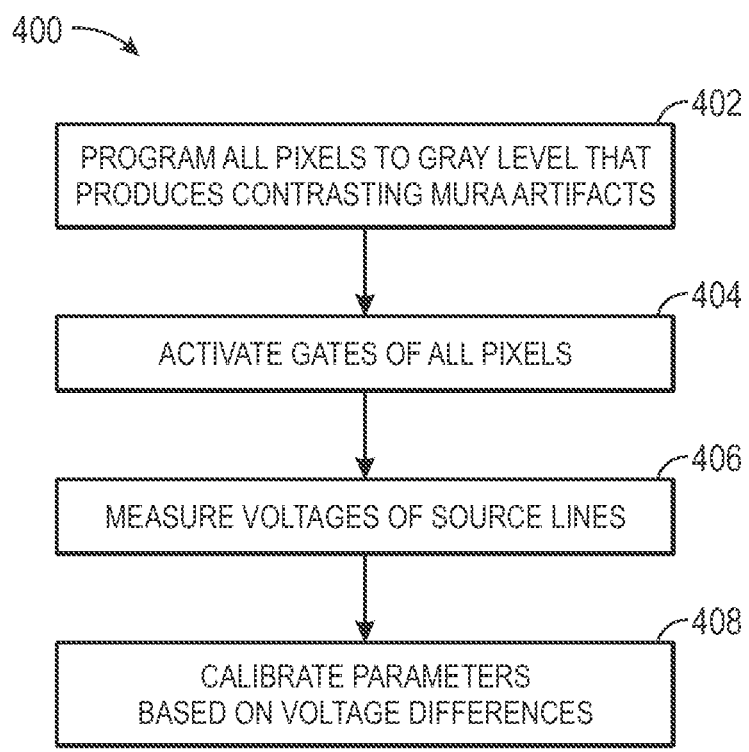
FIG. 14 is a flowchart of a method for calibrating the LCD to reduce or eliminate mura artifacts by adjusting the gate clock fall time, gate clock overlap, source output parking voltages, and/or resistance or capacitance of the VCOMs, in accordance with an embodiment.

The mura calibration circuitry 128 may operate in tandem with certain circuitry at the pixel array 100 to perform the method of FIG. 14. For example, as shown in FIG. 15, the pixel array 100 may include switches 420 to route source lines 106 to different circuitry during different modes of operation.

During normal operation, the switches 420 may route source lines 106 to source voltage drivers (Vs) 422. During a calibration mode, a switching signal 424 may cause the switches 420 to route the source lines 106 to test lines 426 instead.

Figure 15:
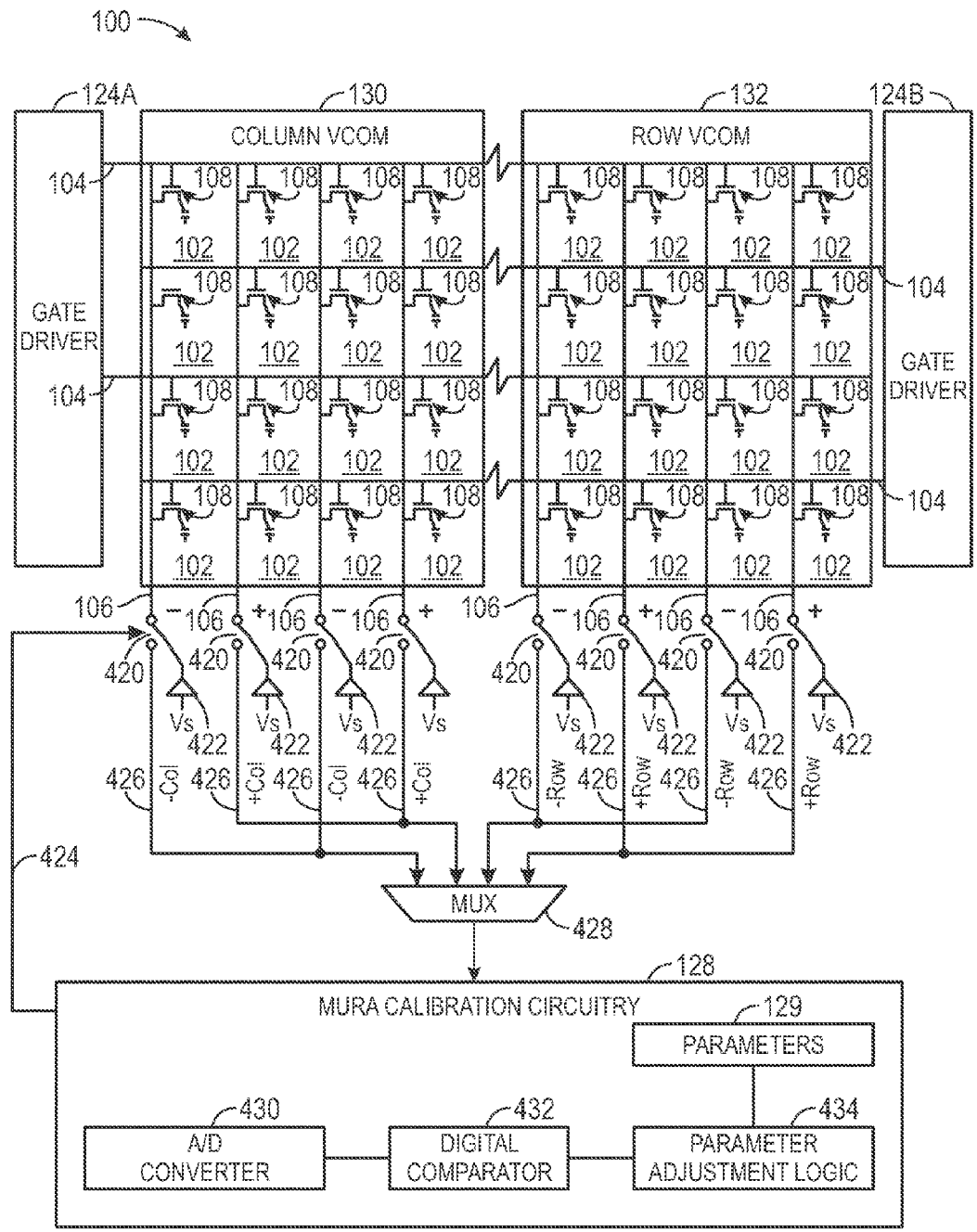
FIG. 15 is a block diagram of display circuitry to self-calibrate the LCD to reduce and/or eliminate mura artifacts, in accordance with an embodiment.

In the example of FIG. 15, the source voltage drives (Vs) 422 drive the pixel array using column inversion. That is, every neighboring column of pixels 102 is driven at an opposite polarity. For instance, the columns of pixels may be driven in the order shown in FIG. 15 (e.g., −+−+−+−+) for one frame. In the next frame, the polarities may be reversed (e.g., +−+−+−+−). To emphasize specific features of the display 18 that allow the display 18 to self-calibrate, FIG. 15 illustrates only a few pixels 102 on a column VCOM 130 and a few pixels 102 on a row VCOM 132. It should be understood, however, that the circuitry shown in FIG. 15 may be employed across the entire display 18. Alternatively, the circuitry of FIG. 15 may be employed on only a subset of columns of pixels 102. For instance, only those columns of pixels 102 with the greatest propensity to show the mura artifact may use the circuitry shown in FIG. 15.

As noted above, during normal operation, the switches 420 may remain coupled to the source voltage drives (Vs) 422. The source voltage drives (Vs) 422 may supply data signals as the gate lines 104 active rows of pixels 102 one by one. When the display 18 is to be calibrated, however, the mura calibration circuitry 128 or other circuitry in the display 18 may supply the switching signal 424 to the switches 420. Upon receipt of the switching signals 424, the switches 420 may switch the source lines 106 to the test lines 426.

As seen in FIG. 15, certain source lines 106 coupled to pixels 102 driven at the same polarities may be coupled together. For instance, the test lines 426 associated with positive source lines 106 of the column VCOMs 130 may be coupled together, and so forth. The test lines 426 associated with pixels driven at common polarities may be coupled together because the voltages on all of the associated pixels 102 are expected to be the same. Coupling these test lines 426 together, then, may enhance the efficacy of the voltage detectable on the test lines 426 by summing together the total capacitance of the electrically connected pixels 102. A multiplexer 428 may receive the resulting four signals −Col, +Col, −Row, and +Row and provide them one-at-a-time to the mura calibration circuitry 128. The mura calibration circuitry 128 may represent a processor (e.g., a microcontroller) or any other suitable circuitry in the display driver circuitry 121. Moreover, the mura calibration circuitry 128 may include an analog-to-digital (A/D) converter 430, a digital comparator 432, and parameter adjustment logic 434. The signals may be processed by the analog-to-digital (A/D) converter 430, compared in the digital comparator 432, and used by the parameter adjustment logic 434 to establish new operational parameters 129.

Figure 16:
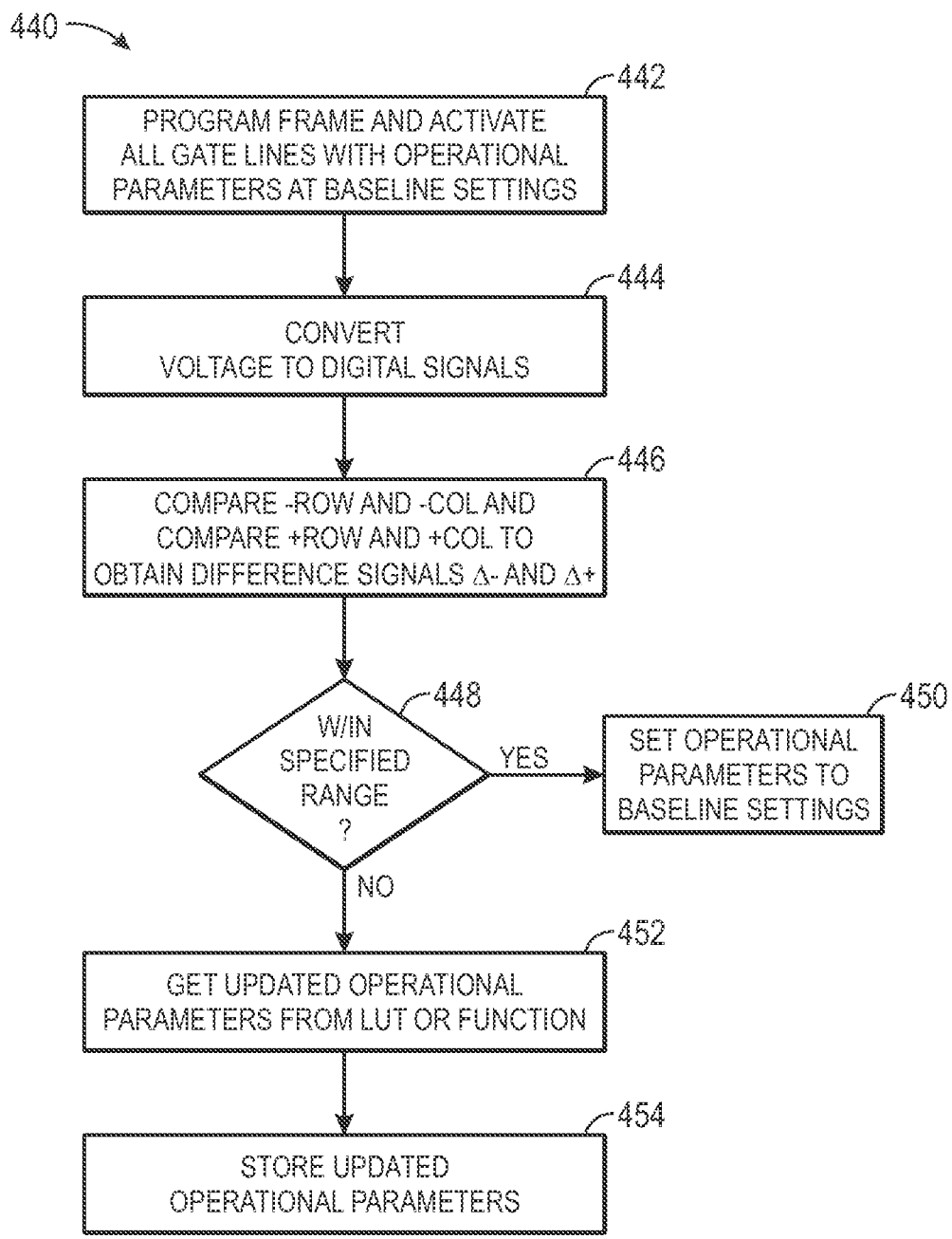
FIG. 16 is a flowchart of a method for calibrating the LCD using the circuitry of FIG. 15 in one frame, in accordance with an embodiment.

In one example, described by a flowchart 440 in FIG. 16, the mura calibration circuitry 128 may program the operational parameters 129 to reduce or eliminate the mura artifact over the course of a single frame. The flowchart 440 may begin when the pixels 102 of the display 18 are programmed using a gray level that result in a contrasting mura artifact (e.g., gray level G63) as in normal operation before all or a subset of the gate lines 104 are activated (block 442). The pixels 102 are programmed as if the display 18 were in normal operation to capture a measurement of the mura artifact as it would appear in normal operation. Moreover, the display 18 may program the pixels 102 using some baseline operating parameters 129. The baseline operating parameters 129 may be selected to provide a point of comparison for selecting the updated operating parameters 129, as discussed further below.

The mura calibration circuitry 128 may receive the source line 106 voltages from the multiplexer (MUX) 428 and, using the A-D converter 430, or may obtain digital versions of these signals (block 444). Using the digital comparator 432, the mura calibration circuitry 128 may compare the row voltages and column voltages by polarity (block 446). That is, the −Row and −Col. voltages may be compared to one another to obtain a difference signal (Δ−) and comparing the +Row and +Col voltages to obtain a difference signal (Δ+). These difference signals Δ− and Δ+ represent voltage values related to the mura artifact. That is, the greater the difference values Δ− and Δ+, the more apparent the mura artifact may be to a user.

If the difference signals Δ− and Δ+ are small enough to fall within some specified range (decision block 448), the mura artifact may be sufficiently imperceptible to a user. unchanged. Thus, the operational parameters 129 may remain unchanged (block 450). Otherwise, if the difference signals Δ− and Δ+ are sufficiently large so as to be outside of the specified range (decision block 448), the mura artifact may be perceptible. The operational parameters 129 thus may be changed.

In particular, the difference signals Δ− and Δ+ may be used in a look-up table (LUT) or a function implemented in the parameter adjustment logic 434 to obtain new operational parameters (block 452). The LUT or function may translate the difference signals Δ− and Δ+ into operational parameters 129 that may reduce or eliminate the mura artifact. These operational parameters 129 may be stored in the display driver circuitry 121 and govern the operation of the display 18 (block 454).

Figure 17:
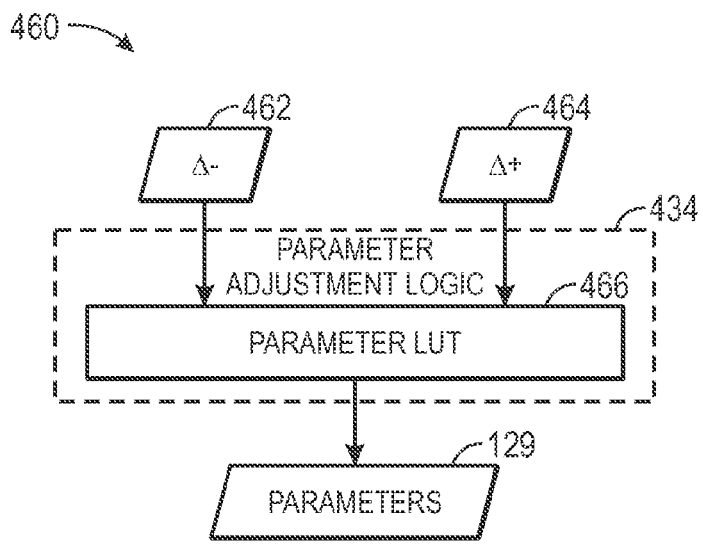
FIGS. 17 and 18 are flow diagrams of methods for obtaining adjusted operational parameters to reduce or eliminate mura artifacts over the course of one frame, in accordance with embodiments.
Figure 18:
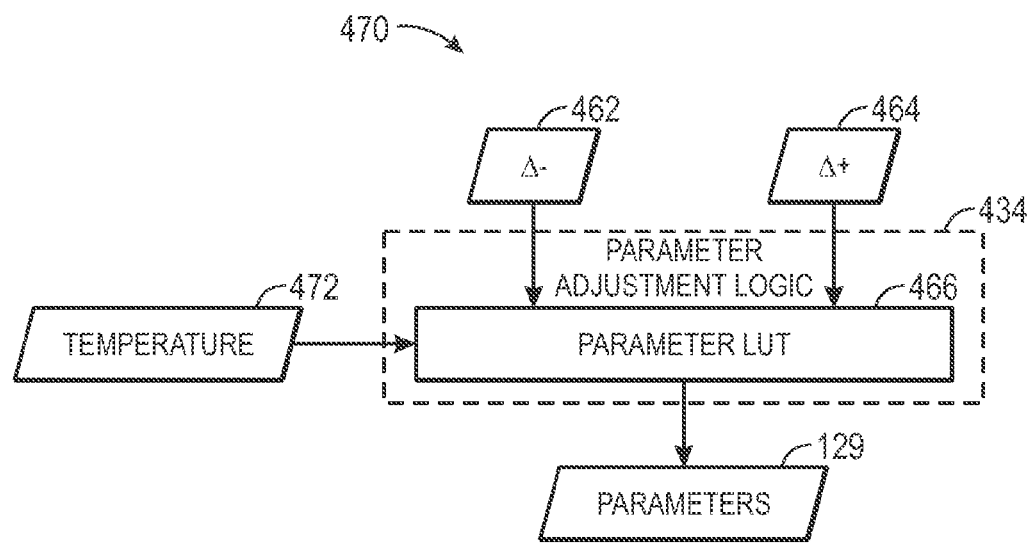

Flow diagrams shown in FIGS. 17 and 18 describe how the updated operational parameters 129 may be obtained from the difference signals Δ− and Δ+. A first flow diagram 460 of FIG. 17 relies on a two-dimensional table. Specifically, the difference signal Δ− (numeral 462) and the difference signal Δ+ (numeral 464) may be provided to a parameter look-up table (LUT) 466. The parameter LUT 466 may represent an element of the parameter adjustment logic 434 in the mura calibration circuitry 128. The parameter LUT 466 may be indexed by the difference signal Δ− 462 and the difference signal Δ+ 464. The entries of the parameter LUT 466 may be populated using experimental data. This experimental data may be obtained in any suitable way. For example, the experimental data with which to populate the parameter LUT 466 may be obtained by testing one or more samples of displays 18 as the displays 18 are being manufactured. The displays 18 may be tested using the baseline operational parameters 129. Thus, the entries of the parameter LUT 466 may translate values of the difference signals Δ− 462 and Δ+ 464, obtained using the baseline operational parameters 129, to updated operational parameters 129 experimentally shown to reduce or eliminate the mura artifacts in the sampled displays 18. It should be appreciated that, in other embodiments, the experimental values used to program the parameter LUT 466 may instead be used to formulate a function (e.g., a polynomial function) that similarly may be able to transform the difference signal Δ− 462 and the difference signal Δ+ 464 into the proper operational parameters 129.

In other embodiments, the parameter LUT 466 may be of a higher order. For instance, as shown in a flow diagram 470 of FIG. 18, the parameter LUT 466 may also consider a temperature signal 472 (e.g., from the temperature sensor 30). Thus, in the example of FIG. 18, the parameter LUT 466 may be programmed, for example, as a three-dimensional look-up table. To populate the parameter LUT 466 shown in FIG. 18, samples of the displays 18 being manufactured may be tested at the baseline operational parameters 129 at various temperatures, and the resulting values of operational parameters to reduce or eliminate the mura artifact recorded. Accordingly, the parameter LUT 466 may provide different values of operational parameters 129 depending on the temperature signal 472 as well as the difference signal Δ− 462 and the difference signal Δ+ 464. By considering temperature as well as the voltage differences on the display 18, the mura artifact may be more likely to be reduced or eliminated.

Figure 19:
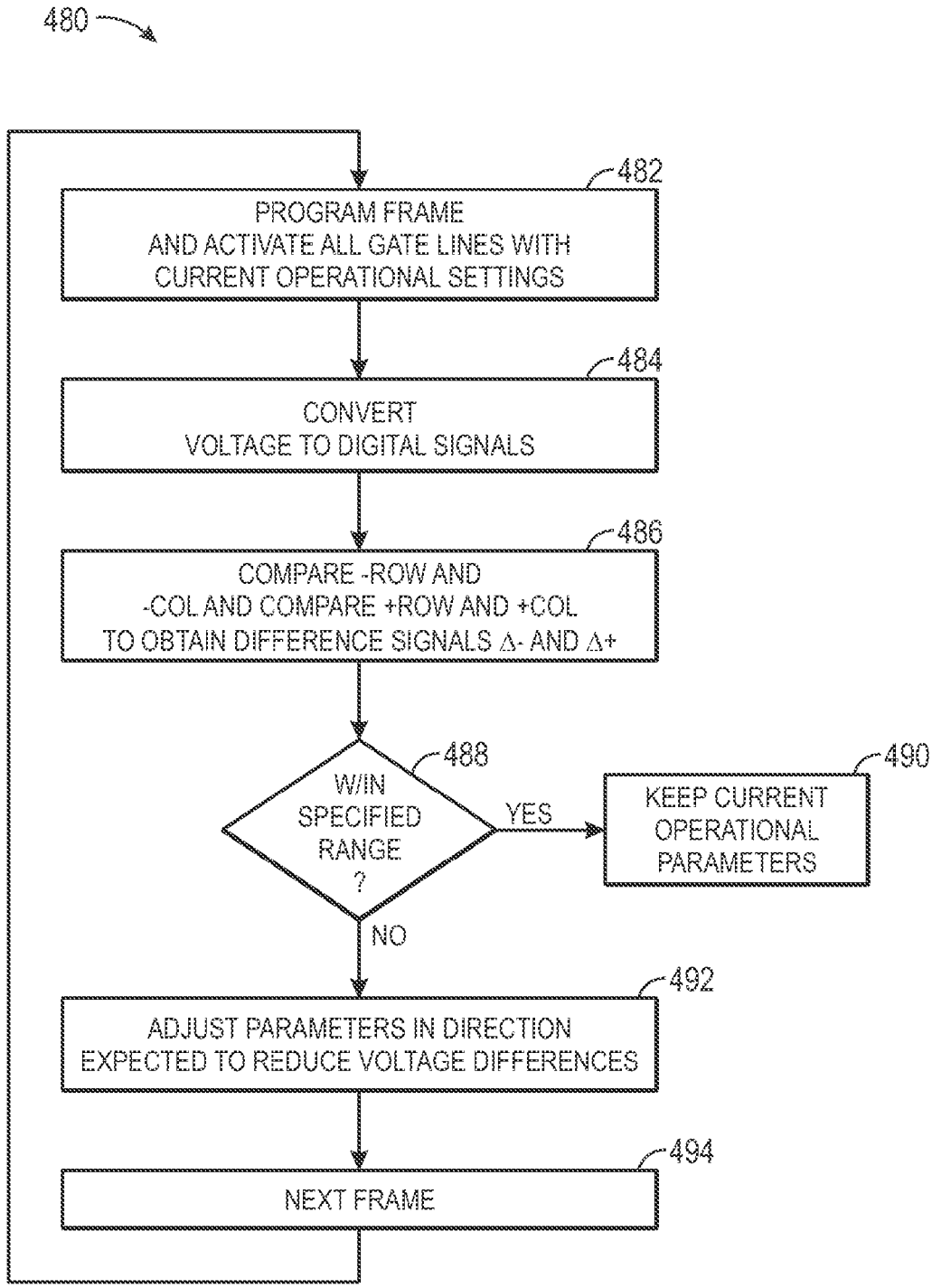
FIG. 19 is a flowchart of a method for calibrating the LCD using the circuitry of FIG. 15 by iteratively adjusting the operational parameters of the LCD over multiple frames, in accordance with an embodiment.

In alternative embodiments, the mura calibration circuitry 128 may calibrate the display 18 over a series of frames rather than in a single frame. For instance, a flowchart 480 of FIG. 19 describes a manner of calibrating the display 18 by varying the operational parameters 129 in an iterative process. The measurements of the voltages on the source lines 106 may be used as feedback to determine the next iteration of the operational parameters 129, until the operational parameters 129 produce feedback within the specific range, signifying that the mura artifact has been reduced or eliminated.

The flowchart 480 begins when the pixels 102 of the display 18 are programmed with the gray level that causes the mura artifact to be strongest (e.g., G63), and all or a substantial number of the gate lines 104 are activated (block 482). It is noted that the pixels 102 are not programmed using some baseline operational parameters 129. Rather, the pixels 102 are programmed using whatever current operational parameters 129 the display 18 happens to be using at the time. The mura calibration circuitry 128 may receive and convert the source line voltages into digital signals (block 484) in the manner discussed above, before comparing the −Row and −Column and +Row and +Column values to obtain the difference signals Δ− and Δ+ (block 486).

When the difference signals Δ− and Δ+ are within the specified range (decision block 488), a mura artifact is likely not visible to a user. As such, the mura calibration circuitry 128 may keep the current operational parameters 129 unchanged (block 490) and calibration may end. On the other hand, if the difference signals Δ− and Δ+ are outside of the specified range (block 488), thus meaning that the mura artifacts may be visible, the operational parameters 129 may be adjusted.

In particular, the operational parameters 129 may be adjusted by some amount in an effort to reduce the voltage differences of the different signals Δ− and Δ+ (block 492). The degree to which the operational parameters 129 are changed may be fixed or may vary depending on the magnitude of the difference signals Δ− and Δ+. In one example, one or more of the operational parameters 129 may be increased by a discrete amount when the difference signals Δ− and Δ+ have particular polarities, and decreased by the particular discrete amount when the opposite is true. In other embodiments, the discrete amount may be higher or lower depending on the magnitude of the difference signals Δ− and Δ+—the higher the magnitude, the greater the discrete amount that the operational parameters 129 may be changed. Having adjusted the operational parameters 129 by some amount, the display 18 may begin the next frame (block 494). The process may repeat until the operational parameters 129 have been adjusted such that the difference signals Δ− and Δ+ are within the specified range.

Figure 20:
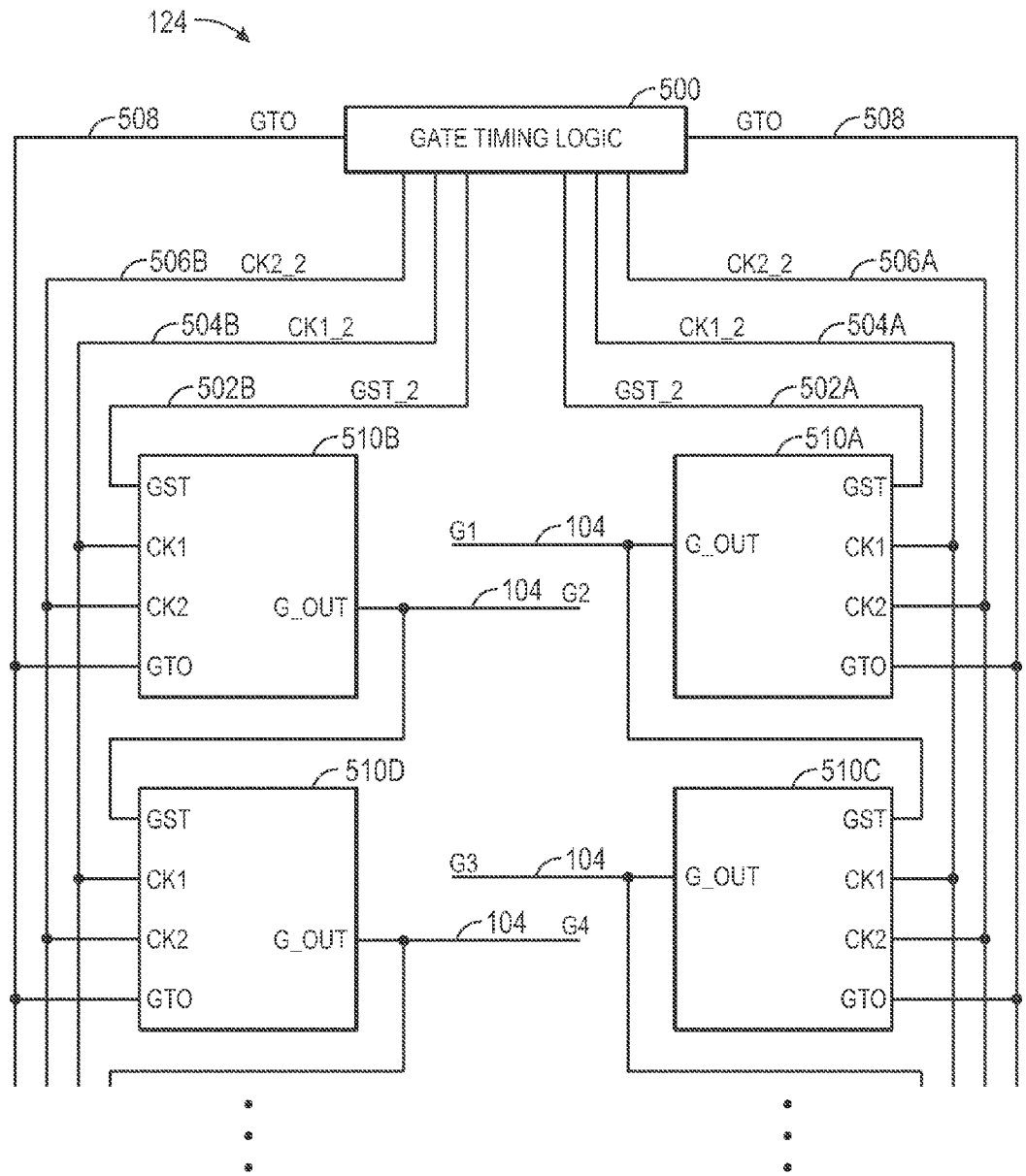
FIG. 20 is a plot diagram of display circuitry to turn on all gates at once, to allow all pixels on a source line to be sampled at once, in accordance with an embodiment.

In the examples discussed above, the voltages of the pixels 102 are tested on the source lines after all of the gate lines 104 have been activated. A block diagram of the gate driver circuitry 124 shown in FIG. 20 illustrates circuitry to enable all of the gate lines 104 to be activated at one time. In the block diagram shown in FIG. 20, gate timing logic 500 provides several signals to control the timing of the gate line 104 activation signals. For instance, for gate lines G1 and G3, controlled from circuitry on the right side of the display, the gate timing logic 500 may provide a gate start (GST_1) signal 502A, a first clock (CK1_1) signal 504A, and a second clock (CK2_1) signal 506A. Similar signals 502B, 504B, and 506B are provided to circuitry on the left side of the display 18. In addition, in some embodiments, the gate timing logic 500 may provide a gate turn on (GTO) signal 508. The signals 502, 504, and 506 are provided to gate activation drivers 510A, 510B, 510C, and 510D. It should be appreciated that in an actual implementation, as many gate activation drivers 510 may be present as gate lines 104.

The gate turn on (GTO) signal 508 may cause all of the gate activation drivers 510 to become activated at once. The signal line to provide the gate turn on (GTO) signal 508 may encompass a single trace on the left side and the right side of the display panel in the gate driver circuitry 124. In other embodiments, the gate activation drivers 510 may be designed to turn on when supplied a particular combination of clock signals 504 and 506. For example, the gate activation drivers 510A and 510C may output a gate activation signal when the clock signals 504A and 506A are both set high at the same time.

The calibration may take place at any number of different times to reduce perceptibility of the calibration and/or the mura artifact itself to the user of the electronic device. FIGS. 21-25, for example, provide various examples of methods for calibrating the display 18 at certain times. It should be appreciated that these methods are not mutually exclusive and may be combined. Moreover, in the examples discussed below, the calibration of the display 18 may take place as initialized by the electronic device 10 and/or as originated in the display 18 itself.

Figure 21:
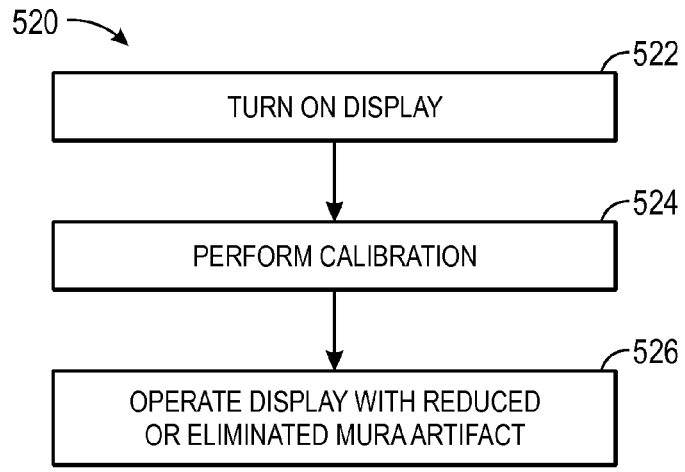
FIG. 21 is a flowchart of a method for calibrating the LCD when the display is turned on, in accordance with an embodiment.

In a flowchart 520 of FIG. 21, when the display 18 is turned on (block 522), the calibration may be performed (block 524). For example, when the electronic device 10 is turned on, or awoken from a lower power mode, the calibration may be performed. The calibration may be performed before or after the backlight of the display 18 has been turned on. When performed before the backlight is turned on, programming the gray level onto the pixels 102 may be virtually invisible to the user. Thereafter, the display 18 may be operated in the electronic device 10 with reduced or eliminated mura artifacts (block 526).

Figure 22:
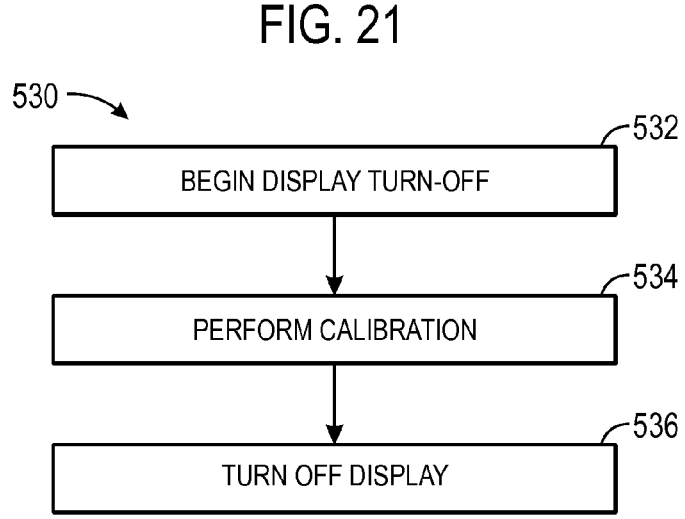
FIG. 22 is a flowchart of a method for calibrating the LCD when the LCD is turned off, in accordance with an embodiment.

In another example, shown in a flowchart 530 of FIG. 22, calibration may occur when the display 18 is turned off. That is, when the electronic device 10 is turned off or caused to enter a low-power mode, signifying the display 18 is being turned off (block 532), the calibration of the display 18 may occur (block 534). Calibration may take place before or after the backlight of the display 18 is turned off. After calibration, the display 18 may be fully turned off (block 536). Thereafter, when the display 18 is turned back on, the display 18 will more likely be calibrated not to display a visible mura artifact then where the display 18 not calibrated.

Figure 23:
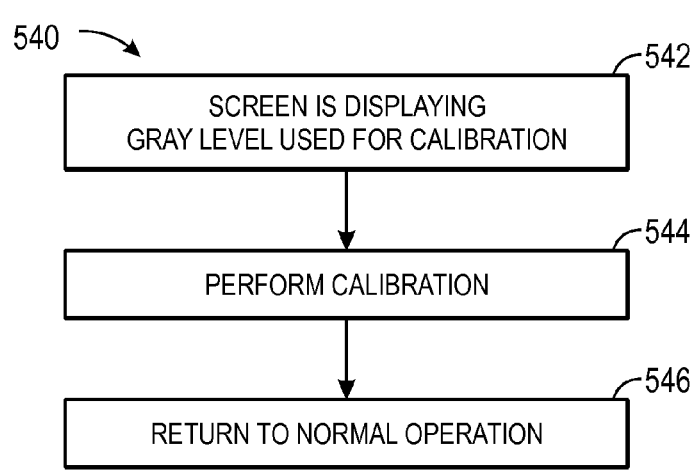
FIG. 23 is a flowchart of a method for calibrating the LCD when the LCD is displaying a particular gray level, in accordance with an embodiment.
Figure 24:
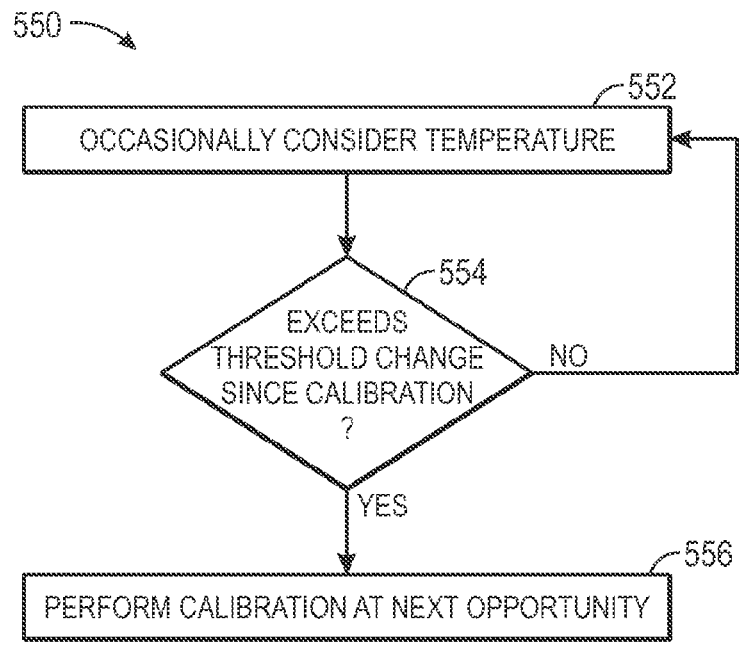
FIG. 24 is a flowchart of a method for calibrating the LCD based on a temperature of the LCD, in accordance with an embodiment.
Figure 25:
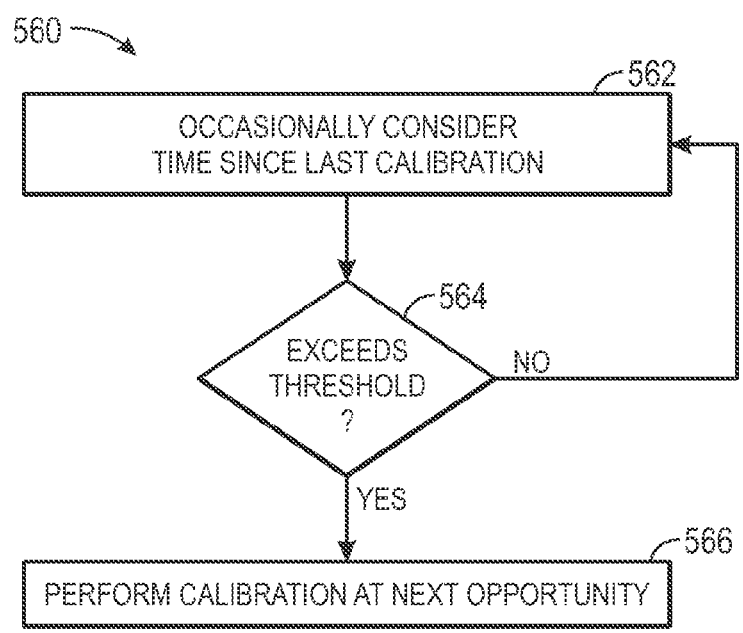
FIG. 25 is a flowchart of a method for calibrating the LCD based on a time since the LCD was last calibrated, in accordance with an embodiment.

As shown in a flowchart 540 of FIG. 23, at various times the display 18 may happened to be displaying a gray level suitable for calibration (block 542). For instance, an application or an operating system running on the electronic device 10 may temporarily display a screen of uniform gray level, even if only fleetingly (e.g., during a transition from one screen to another or to indicate that a screen capture has occurred). At these times, because the display 18 is already currently displaying the gray level on its pixels 102, the display 18 may be calibrated (block 544) without getting the user's attention, particularly if the calibration occurs over only one frame.

After the display 18 has been calibrated, the display 18 may return to normal operation (block 546) and the user may never notice.

The display 18 also may be calibrated based on the temperature of the display 18. For example, as seen in a flowchart 550 of FIG. 24, the display 18 and/or the electronic device 10 may occasionally check the current temperature of the display 18 and/or the electronic device 10 (block 552). For instance, the temperature may be considered periodically (e.g., every 10 minutes) or at other times. If the temperature has changed by more than some threshold amount (e.g., 10 degrees Celsius) since the display 18 was last calibrated (decision block 554), the electronic display 18 may be calibrated at the next opportunity (block 556). Otherwise, the display 18 may maintain the current calibration.

It should be appreciated that the temperature of the display 18 may affect the presence or absence of the mura artifact on the display 18. As such, a drastic change in temperature could imply that the current operational parameters 129 could be insufficient to reduce or eliminate the mura artifact. The next opportunity to calibrate the display 18 may be the very next frame, but the user could notice if the display 18 is calibrated while the user is using the electronic device 10. As such, in some embodiments, the display 18 may be calibrated at the next opportunity for which the user is unlikely to notice (e.g., when the display 18 is started, or is turned on, turned off, or displaying the gray level for other reasons as described in FIGS. 21-23).

Similarly, the amount of time that has passed could also imply that the operational parameters 219 no longer suffice to reduce or eliminate the mura artifact. As such, as seen in a flowchart 560 of FIG. 25, the display 18 or electronic device 10 may occasionally consider the time elapsed since the last calibration (block 562). When the amount of time exceeds some threshold (block 564), the display 18 may perform the calibration at the next opportunity (block 566).

Technical effects of this disclosure include, among other things, the reduction or elimination of a mura artifact on an electronic display. The reduction or elimination of the mura artifact can be achieved without visual feedback, thereby eliminating a need to calibrate display using expensive cameras. Moreover, the displays may be calibrated many times over the lifespan of the display. In this way, normal changes in the display over time can also be accounted for. Moreover, in some embodiments, the display may be calibrated over the course of a single frame (e.g., within 16 ms when the display operates at 60 hertz).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
 programming pixels of an electronic display with a frame of pixel data of a uniform gray level;
 activating at least one gate line connected to the pixels, thereby causing voltages stored on the pixels to be detectable as source line voltages on respective source lines of the electronic display;
 detecting a plurality of the source line voltages, the plurality of the source line voltages comprising:
  a first positive source line voltage present on at least one source line of a first area of the electronic display;
  a first negative source line voltage present on at least one other source line of the first area of the electronic display;
  a second positive source line voltage present on at least one source line of a second area of the electronic display; and
  a second negative source line voltage present on at least one other source line of the second area of the electronic display;
 comparing the first positive source line voltage and the second positive source line voltage to obtain a first difference signal;
 comparing the first negative source line voltage and the second negative source line voltage to obtain a second difference signal; and
  when the first difference signal or the second difference signal, or both, are outside a range of acceptable values, updating an operational parameter of the electronic display, wherein the updated operational parameter is configured to cause the first and second positive source line voltages to be more similar or cause the first and second negative source line voltages to be more similar, or both.

2. The method of claim 1, wherein:
 programming the pixels comprising programming all of the pixels of the electronic display; and
 activating at least one gate line comprises activating all of the gate lines of the electronic display.

3. The method of claim 1, comprising, after the pixels are programmed but before the source line voltages are detected, controlling one or more switches to:
 disconnect the source lines of the electronic display from circuitry used to program the pixels; and
 connect the source lines to voltage measurement circuitry configured to detect the source line voltages.

4. The method of claim 1, comprising obtaining the updated operational parameter using a function of the first difference signal and the second difference signal.

5. The method of claim 1, comprising obtaining the updated operational parameter using a two-dimensional lookup table that indexes the first difference signal and the second difference signal.

6. The method of claim 1, comprising obtaining the updated operational parameter using a three-dimensional lookup table that indexes the first difference signal, the second difference signal, and a current temperature of the electronic display.

7. The method of claim 1, comprising obtaining the updated operational parameter by increasing or decreasing the operational parameter in a direction expected to cause the first and second positive source line voltages to be more similar or cause the first and second negative source line voltages to be more similar, or both.

8. The method of claim 1, comprising repeating the method until the first difference signal or the second difference signal, or both, are within the range of acceptable values.

9. A method comprising:
 programming pixels of an electronic display to a uniform gray level;
 activating some or all of the programmed pixels;
 measuring voltages of the programmed pixels; and
 adjusting at least one operational parameter of the electronic display based at least in part on a voltage difference between programmed pixels of different areas of the electronic display to reduce or eliminate a mura artifact related to the voltage difference;

wherein the different areas of the electronic display comprise a first area with a first common voltage layer and a second area with a second common voltage layer, and wherein the first common voltage layer and the second common voltage layer have different electrical characteristics at least before the adjustment.

10. The method of claim 9, wherein the different areas of the electronic display comprise a first area with a first common voltage layer and a second area with a second common voltage layer not electrically coupled to the first common voltage layer.

11. The method of claim 9, wherein the voltages of the pixels are measured by circuitry within the electronic display.

12. The method of claim 9, wherein the programmed pixels are activated by simultaneously activating several gate lines that control the pixels.

13. The method of claim 9, wherein all of the pixels of the electronic display are programmed and all of the gate lines of the display are simultaneously activated.

14. An electronic display comprising:
a first plurality of pixels associated with a first common voltage layer;
a second plurality of pixels associated with a second common voltage layer, wherein the first common voltage layer and the second common voltage layer have different electrical characteristics at least before calibration; and
mura calibration circuitry configured to:
determine a voltage difference between the first plurality of pixels and the second plurality of pixels when the first plurality of pixels and the second plurality of pixels have been programmed to a common gray level; and
determine a setting for at least one operational parameters to reduce the voltage difference between the first plurality of pixels and the second plurality of pixels.

15. The electronic display of claim 14, wherein the first common voltage layer and the second common voltage layer are configured to have different respective areas, geometries, spatial orientations in relation to source lines or gate lines of the electronic display, impedances, or power supplies, or any combination thereof.

16. The electronic display of claim 14, wherein the first common voltage layer and the second common voltage layer are configured to be used as components of a capacitive touch sensor.

17. The electronic display of claim 14, wherein the common gray level comprises a gray level configured to cause the voltage difference to be greater than would occur with a different gray level.

18. The electronic display of claim 14, wherein the common gray level is approximately equal to a gray level between G40 to G80 out of a range of G0-G255.

19. The electronic display of claim 14, wherein the common gray level is approximately equal to a gray level less than G127 out of a range of G0-G255.

20. The electronic display of claim 14, wherein the common gray level is approximately equal to G63 out of a range of G0-G255.

21. The electronic display of claim 14, wherein the at least one operational parameter comprises a gate clock fall time.

22. The electronic display of claim 14, wherein the at least one operational parameter comprises a gate clock overlap.

23. The electronic display of claim 14, wherein the at least one operational parameter comprises a source output parking voltage.

24. The electronic display of claim 14, wherein the at least one operational parameter comprises a resistance or capacitance, or both, to add to at least one of the first common voltage layer or the second common voltage layer.

25. An electronic device comprising:
a processor configured to generate image data; and
an electronic display configured to display the image data substantially free of a mura artifact, wherein the electronic display is configured to prevent the mura artifact by occasionally calibrating at least one operational parameter of the electronic display based at least in part on a contemporaneous measurement of a voltage difference between pixels of different areas of the electronic display;
wherein the different areas of the electronic display comprise a first area with a first common voltage layer and a second area with a second common voltage layer, and wherein the first common voltage layer and the second common voltage layer have different electrical characteristics at least before calibration.

26. The electronic device of claim 25, wherein the electronic display is configured to calibrate the at least one operational parameter immediately after the electronic display is turned on and able to program the pixels of the different areas of the electronic display.

27. The electronic device of claim 26, wherein the electronic display is configured to calibrate the at least one operational parameter before the backlight supplies light to the electronic display, thereby preventing the calibration from being visible to a user.

28. The electronic device of claim 25, wherein the electronic display is configured to calibrate the at least one operational parameter when the electronic display is to be turned off, but while the electronic display is still able to program the pixels of the different areas of the electronic display and after the backlight has stopped supplying light to the electronic display.

29. The electronic device of claim 25, wherein the electronic display is configured to calibrate the at least one operational parameter when the electronic display is displaying the image data, wherein the image data represents a common value to the pixels of the different areas of the electronic display.

30. The electronic device of claim 25, wherein the electronic display is configured to calibrate the at least one operational parameter after a threshold amount of time since the electronic display last calibrated the at least one operational parameter.

31. The electronic device of claim 25, comprising a temperature sensor, wherein the electronic display is configured to calibrate the at least one operational parameter when the temperature sensor indicates a sensed temperature that exceeds a threshold.

* * * * *